(12) United States Patent
Zhou et al.

(10) Patent No.: US 12,219,539 B2
(45) Date of Patent: Feb. 4, 2025

(54) METHOD AND APPARATUS FOR TRANSMITTING IN WIRELESS COMMUNICATION SYSTEM, RADIO NODE AND COMPUTER-READABLE MEDIUM

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 17/427,062

(22) PCT Filed: Jan. 31, 2020

(86) PCT No.: PCT/KR2020/001515
§ 371 (c)(1),
(2) Date: Jul. 29, 2021

(87) PCT Pub. No.: WO2020/159303
PCT Pub. Date: Aug. 6, 2020

(65) Prior Publication Data
US 2022/0124711 A1 Apr. 21, 2022

(30) Foreign Application Priority Data

Feb. 1, 2019 (CN) .......................... 201910106692.0
Mar. 28, 2019 (CN) .......................... 201910246375.9
Sep. 12, 2019 (CN) .......................... 201910870254.1

(51) Int. Cl.
*H04W 72/0453* (2023.01)
*H04L 5/00* (2006.01)
*H04W 28/26* (2009.01)

(52) U.S. Cl.
CPC ....... *H04W 72/0453* (2013.01); *H04L 5/0053* (2013.01); *H04W 28/26* (2013.01)

(58) Field of Classification Search
None
See application file for complete search history.

(56) References Cited

U.S. PATENT DOCUMENTS

| 2016/0135239 A1 | 5/2016 | Khoryaev et al. |
| 2020/0280999 A1* | 9/2020 | Guo ..................... H04W 72/542 |
| 2021/0352567 A1* | 11/2021 | Kim ..................... H04W 48/02 |

FOREIGN PATENT DOCUMENTS

| WO | WO-2018178309 A1 * | 10/2018 | ............ H04W 16/14 |

OTHER PUBLICATIONS

Catt, "Discussion on coexistence of LTE sidelink and NR sidelink in NR V2X", 3GPP TSG RAN WG1 Ad-Hoc Meeting 1901, Jan. 21-25, 2019, R1-1900328, 7 pages.

(Continued)

*Primary Examiner* — Rebecca E Song

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure provides a method performed by an electronic device in a first system in a wireless communication system, wherein the first system and a second system exist in the wireless communication system, and frequency domain resources used by the first system and the second system at least partially overlap with each other. The includes: obtaining information about overlapped frequency domain resources; determining the overlapped frequency domain resources, the determined overlapped frequency domain resources comprising overlapped frequency domain resources at a subcarrier level; and avoiding performing an (Continued)

uplink transmission and/or avoiding monitoring a downlink transmission on the determined overlapped frequency domain resources.

8 Claims, 9 Drawing Sheets

(56) References Cited

OTHER PUBLICATIONS

Intel Corporation, "In-device Coexistence Mechanisms for NR V2X Communication", 3GPP TSG RAN WG1 Ad-Hoc Meeting 1901, Jan. 21-25, 2019, R1-1900488, 12 pages.
NTT Docomo, Inc., "Views on LTE and NR sidelink coexistence", 3GPP TSG RAN WG1 Ad-Hoc Meeting 1901, Jan. 21-25, 2019, R1-1900968, 4 pages.
Qualcomm Incorporated, "Updated Summary of Coexistence Aspects in NR-V2X (AI 7.2.4.5)", 3GPP TSG RAN WG1 Meeting Ad-Hoc Meeting 1901, R1-1901425, 7 pages.
International Search Report dated May 19, 2020 in connection with International Patent Application No. PCT/KR2020/001515, 2 pages.

* cited by examiner

[Fig. 1]
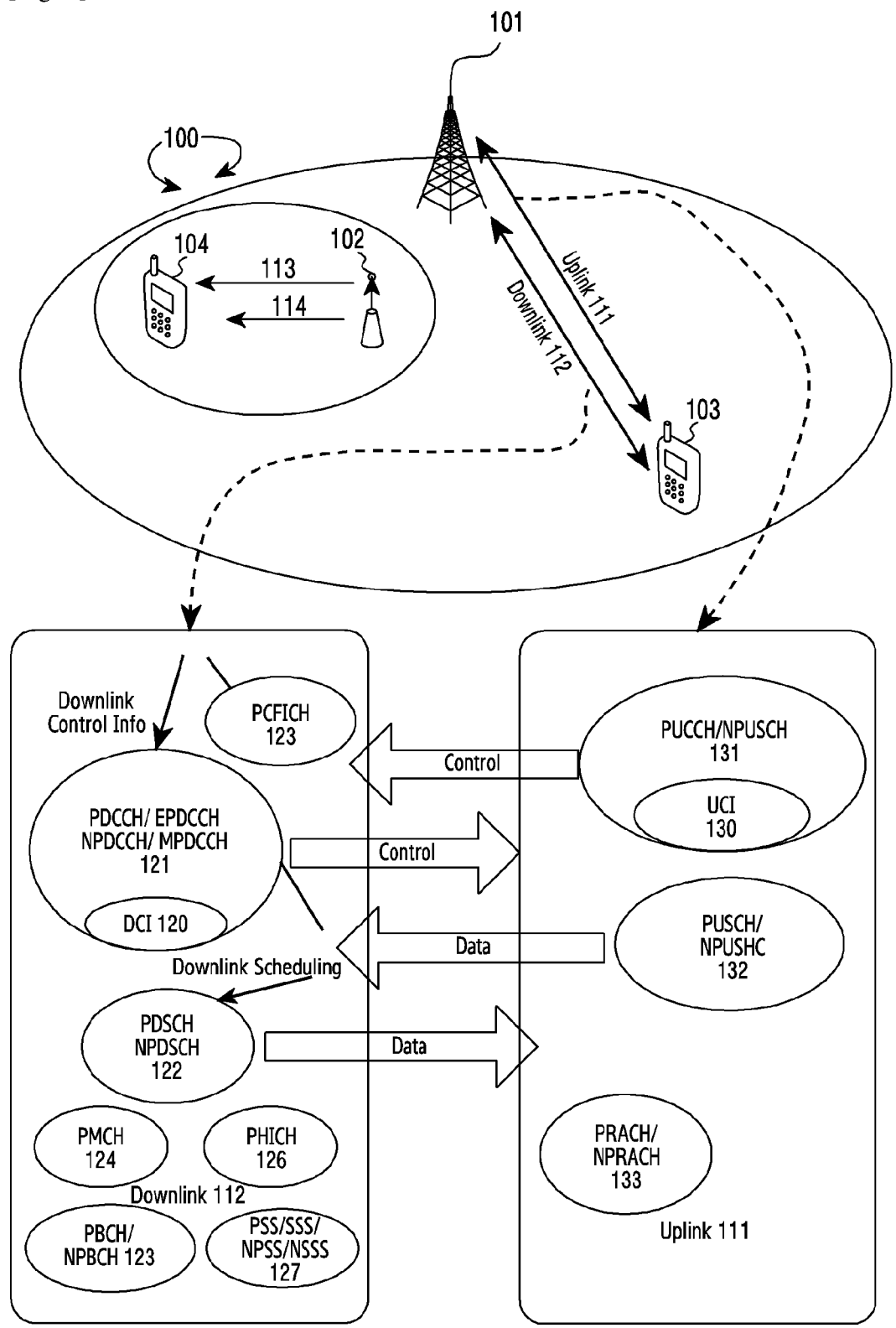

[Fig. 2]
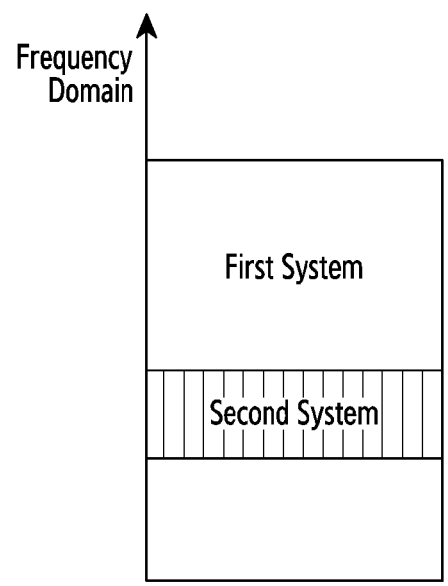

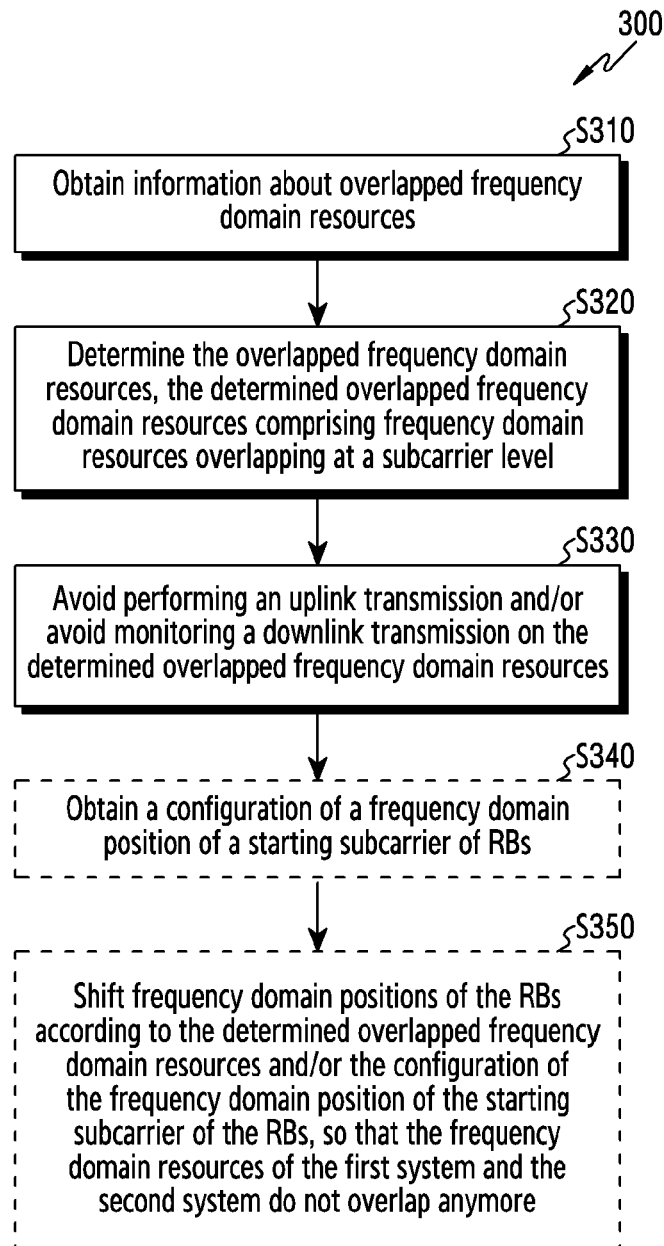
[Fig. 3]

[Fig. 4]
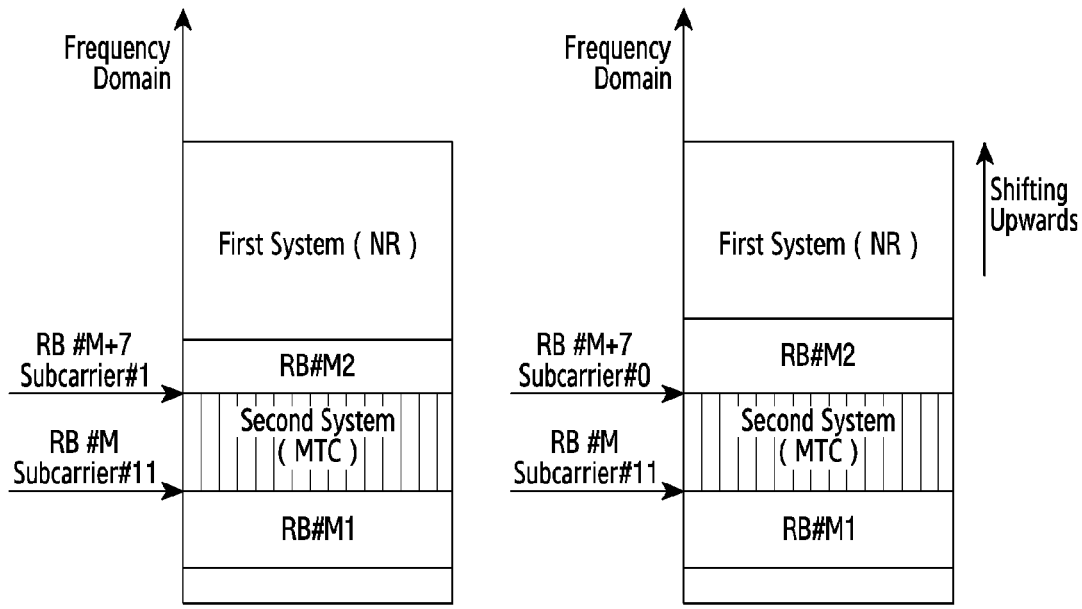
[Fig. 5]
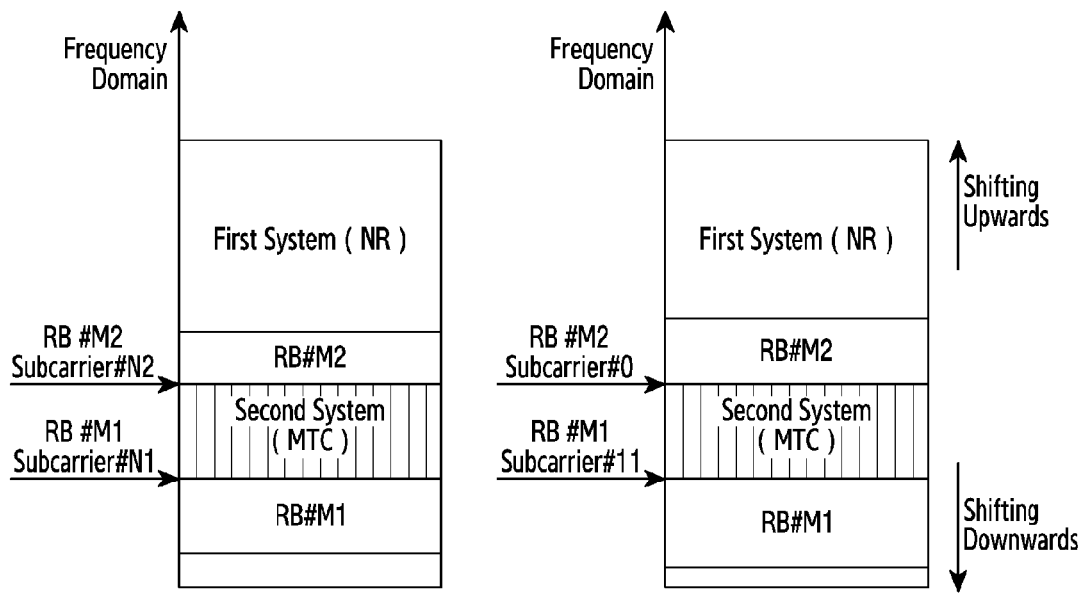

[Fig. 6]
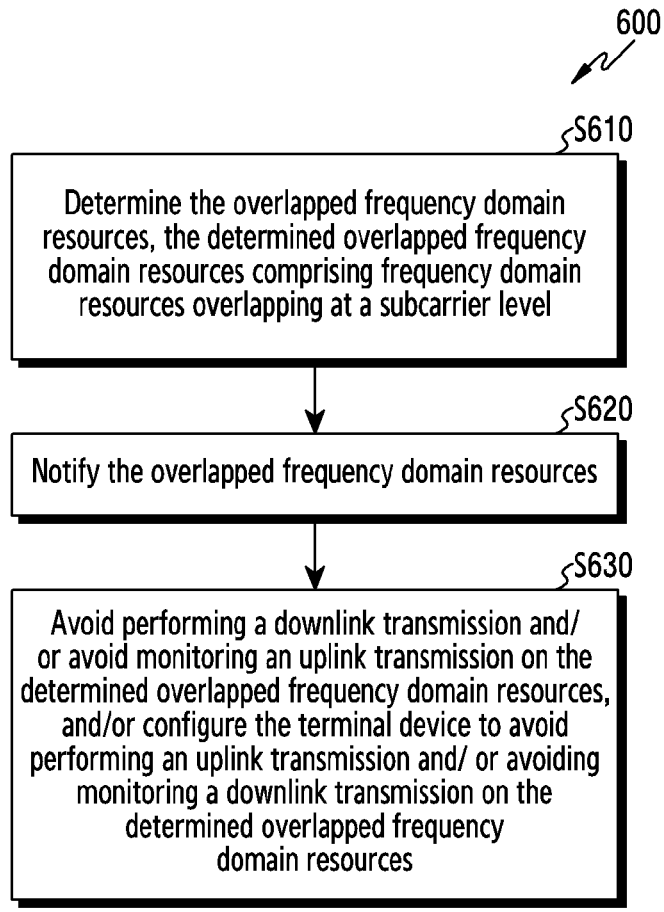
[Fig. 7]
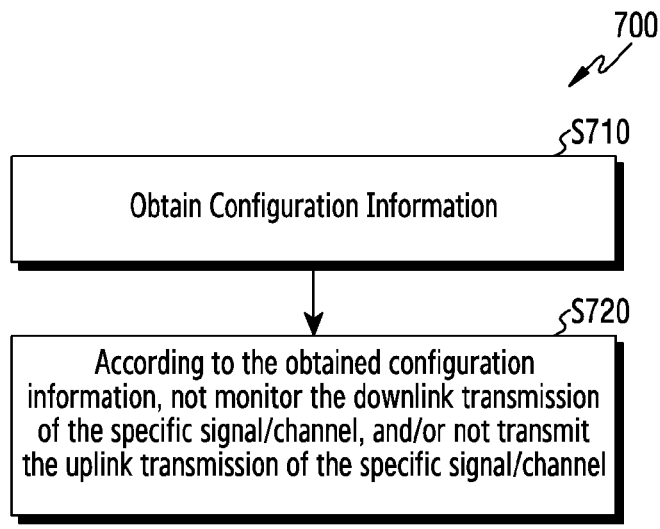

[Fig. 8]
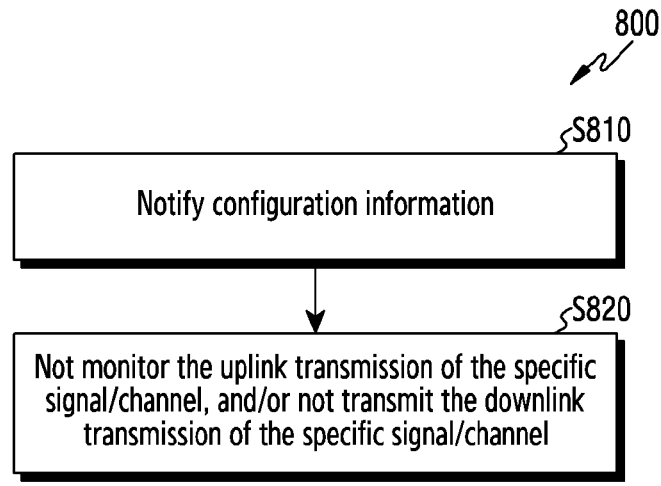
[Fig. 9]
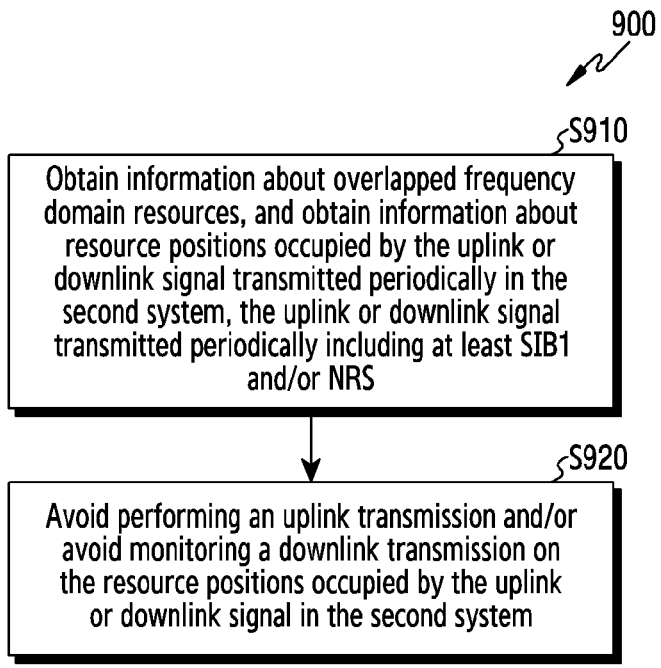

[Fig. 10]
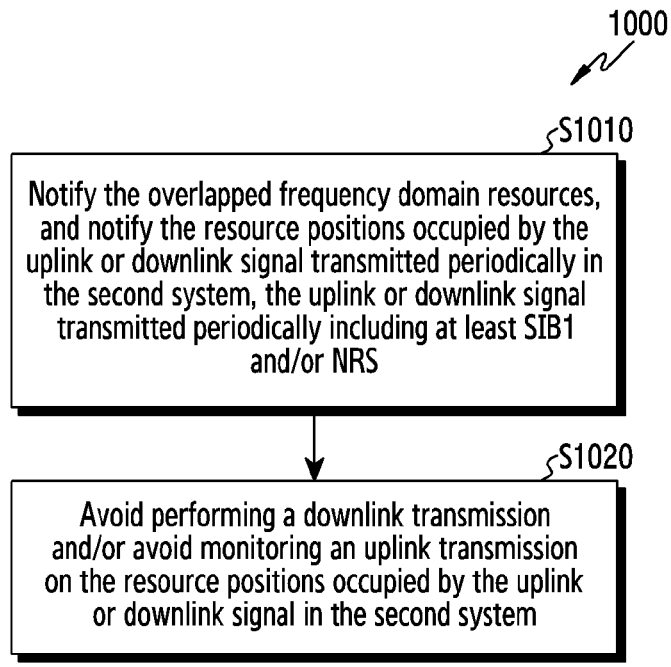
[Fig. 11]
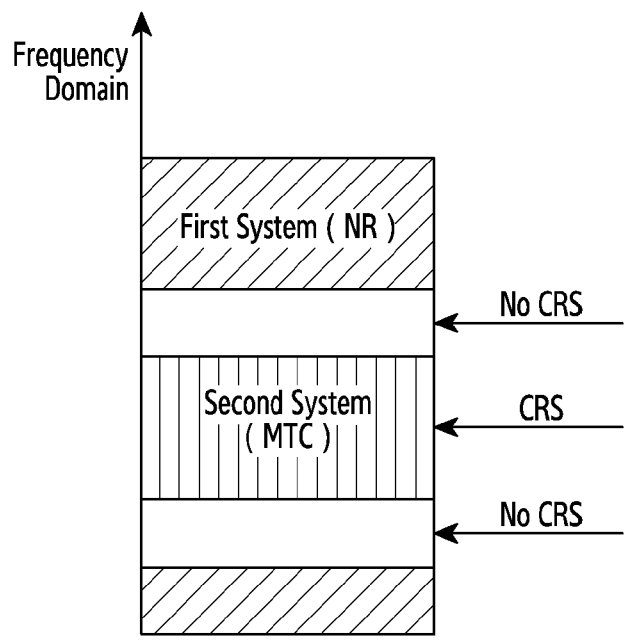

[Fig. 12]
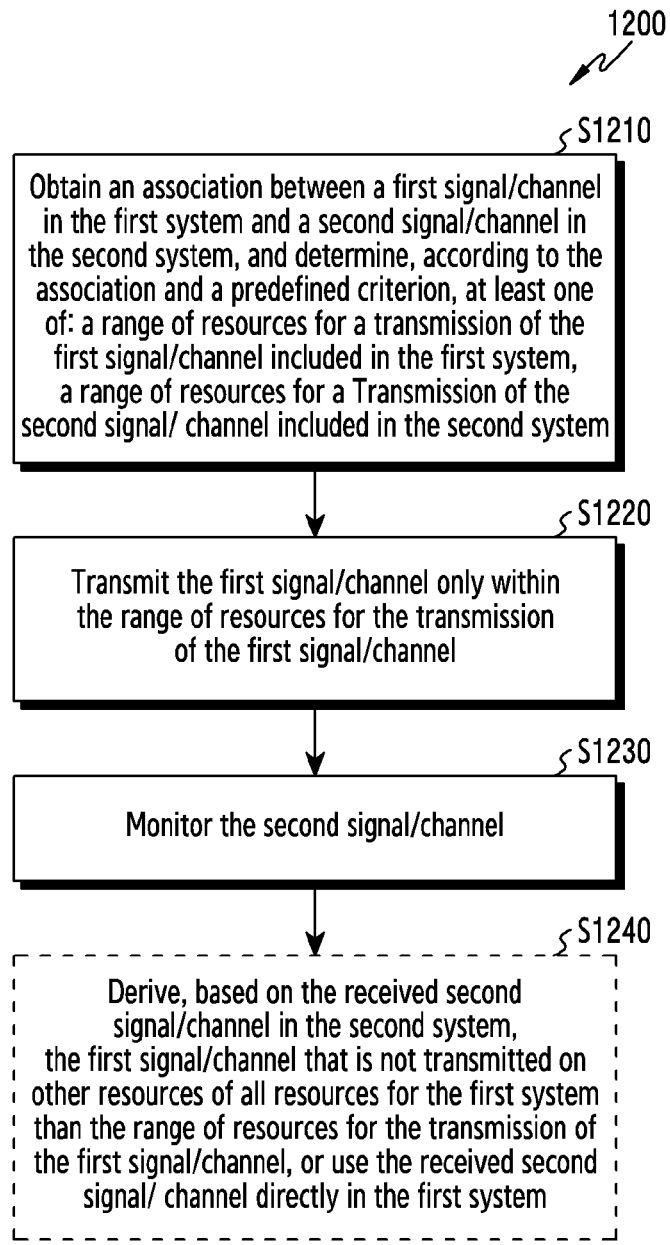

[Fig. 13]
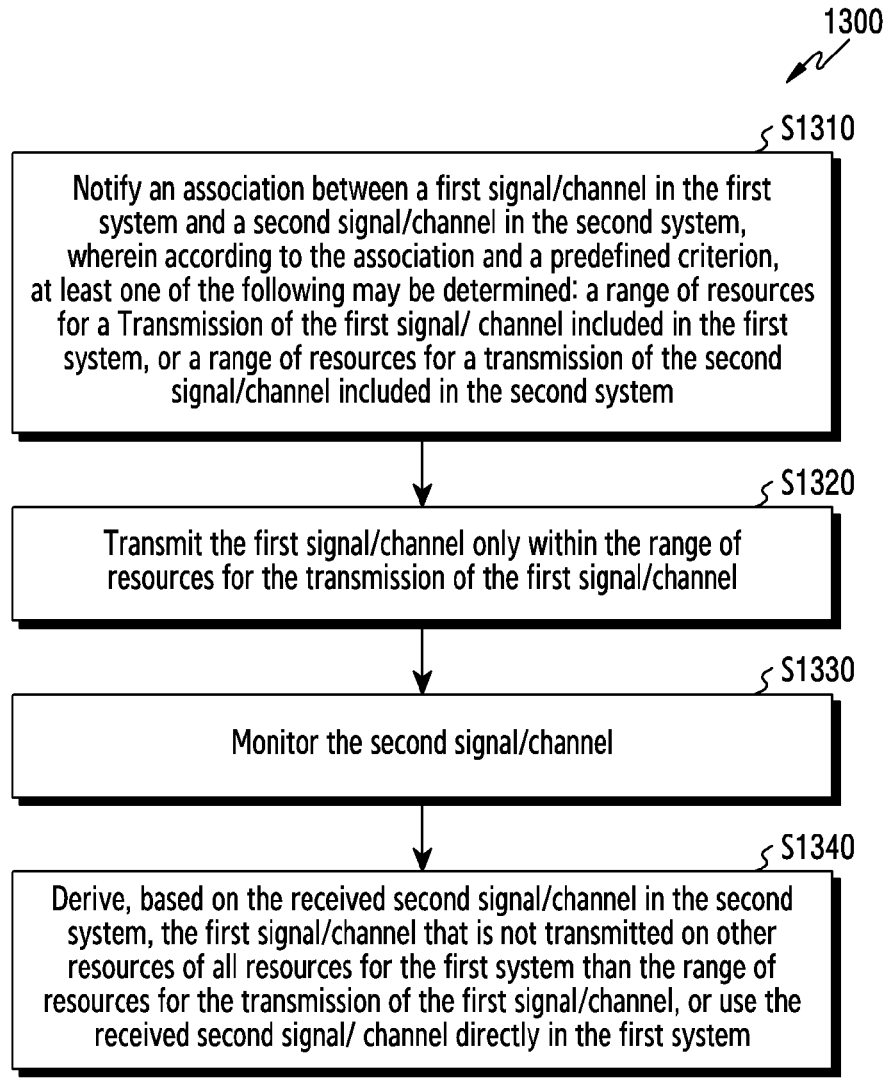
[Fig. 14]
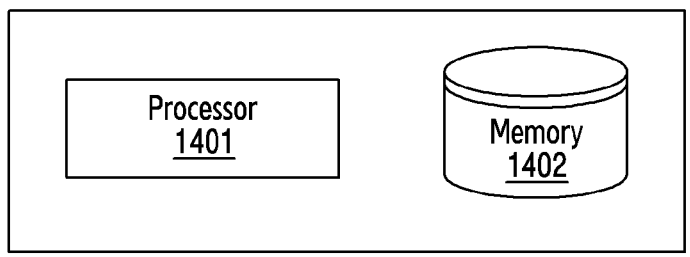

METHOD AND APPARATUS FOR TRANSMITTING IN WIRELESS COMMUNICATION SYSTEM, RADIO NODE AND COMPUTER-READABLE MEDIUM

CROSS-REFERENCE TO RELATED APPLICATIONS

This application is a 371 of International Application No. PCT/KR2020/001515 filed on Jan. 31, 2020, which claims priority to Chinese Patent Application No. 201910106692.0 filed on Feb. 1, 2019, Chinese Patent Application No. 201910246375.9 filed on Mar. 28, 2019, and Chinese Patent Application No. 201910870254.1 filed on Sep. 12, 2019, the disclosures of which are herein incorporated by reference in their entirety.

BACKGROUND

1. Field

The present disclosure relates to the field of wireless communication technologies, and in particular, to method and apparatus for transmitting in a wireless communication system, and a corresponding radio node and computer-readable medium.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a (Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The present application provides method and apparatus for transmitting in wireless communication system, radio node and computer-readable medium.

SUMMARY

According to a first aspect of the present disclosure, there is provided a method performed by an electronic device in a first system in a wireless communication system, wherein the first system and a second system exist in the wireless communication system, and frequency domain resources used by the first system and the second system at least partially overlap with each other, the method comprising: obtaining information about overlapped frequency domain resources; determining the overlapped frequency domain resources, wherein the determined overlapped frequency domain resources comprising frequency domain resources overlapping at a subcarrier level; and avoiding performing an uplink transmission and/or avoiding monitoring a downlink transmission on the determined overlapped frequency domain resources.

According to a second aspect of the present disclosure, there is provided a method performed by an electronic device in the first system in a wireless communication system, wherein the first system and a second system exist in the wireless communication system, and time-frequency resources used by the first system and the second system at least partially overlap with each other, the transmission method comprising: obtaining configuration information, wherein the configuration information comprises a specific signal/channel pattern, the pattern comprising at least a part of overlapped time-frequency resources; and the configuration information further comprises information about the overlapped time-frequency resources, and/or indication information, wherein the indication information comprises: information indicating not monitoring a downlink transmission of the specific signal/channel, and/or information indicating not transmitting an uplink transmission of the specific signal/channel; and according to the obtained configuration information, performing operations of: not monitoring the downlink transmission of the specific signal/channel, and/or not transmitting the uplink transmission of the specific signal/channel.

According to a third aspect of the present disclosure, there is provided a method performed by an electronic device in the first system in a wireless communication system, wherein the first system and a second system exist in the wireless communication system, and frequency domain resources used by the first system and the second system at least partially overlap with each other, and there is an uplink or a downlink signal transmitted periodically in the second system, the transmission method comprising: obtaining information about overlapped frequency domain resources, and obtaining information about resource positions occupied by the uplink or downlink signal transmitted periodically in the second system; and avoiding performing an uplink transmission and/or avoiding monitoring a downlink transmission at the resource positions occupied by the uplink or downlink signal in the second system.

According to a fourth aspect of the present disclosure, there is provided a method performed by an electronic device in the first system in a wireless communication system, wherein the first system and a second system exist in the wireless communication system, the transmission method comprising: obtaining an association between a first signal/channel in the first system and a second signal/channel in the second system, and determining, according to the association and a predefined criterion, at least one of: a range of resources for a transmission of the first signal/channel included in the first system, or a range of resources for a transmission of the second signal/channel included in the second system; transmitting the first signal/channel only within the range of resources for the transmission of the first signal/channel; and monitoring the second signal/channel.

According to a fifth aspect of the present disclosure, there is provided an electronic device in a wireless communication system, including: a processor; and a memory storing computer-executable instructions which, when executed by the processor, cause the processor to perform the method according to any of the first to fourth aspects of the present disclosure.

According to a sixth aspect of the present disclosure, there is provided a computer-readable medium having stored thereon instructions which, when executed by a processor, cause the processor to perform the method according to any of the first to fourth aspects of the present disclosure.

The present application may indirectly achieve the effect of resource reservation at the subcarrier level by reusing the existing mechanism to a extent, thereby avoiding the conflicts that may occur between the coexisting communication systems.

BRIEF DESCRIPTION OF THE DRAWINGS

FIG. 1 schematically illustrates an exemplary wireless communication system to which an exemplary embodiment of the present disclosure may be applied;

FIG. 2 schematically illustrates frequency domain resource overlapping of two systems according to an embodiment of the present disclosure;

FIG. 3 schematically illustrates a flowchart of a transmission method 300 according to an exemplary embodiment of the present disclosure;

FIG. 4 schematically illustrates a method for shifting overlapped frequency domain resources according to an embodiment of the present disclosure;

FIG. 5 schematically illustrates a method for shifting overlapped frequency domain resources according to another embodiment of the present disclosure;

FIG. 6 schematically illustrates a transmission method 600 according to an embodiment of the present disclosure;

FIG. 7 schematically illustrates a transmission method 700 according to an embodiment of the present disclosure;

FIG. 8 schematically illustrates a transmission method 800 according to an embodiment of the present disclosure;

FIG. 9 schematically illustrates a transmission method 900 according to an embodiment of the present disclosure;

FIG. 10 schematically illustrates a transmission method 1000 according to an embodiment of the present disclosure;

FIG. 11 schematically illustrates an example in a case where CRSs (Cell Reference Signal) are reduced;

FIG. 12 schematically illustrates a transmission method 1200 according to an embodiment of the present disclosure;

FIG. 13 schematically illustrates a transmission method 1300 according to an embodiment of the present disclosure; and FIG. 14 schematically illustrates a structural block diagram of a radio node 1400 according to an exemplary embodiment of the present disclosure.

DETAILED DESCRIPTION

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are exemplary for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless otherwise defined, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "UE" and "terminal" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a PCS (Personal Communication Service), which may combine voice, data processing, fax and/or data communication capabilities; a PDA (Personal Digital Assistant), which may include an RF (Radio Frequency) receiver, a pager, Internet/Intranet access, a web browser, a notepad, a calendar, and/or a GPS (Global Positioning System) receiver; a conventional laptop and/or palmtop computer or other device, which may be a conventional laptop and/or palmtop computer or other device having and/or including an RF receiver. The "UE", "terminal" as used herein may be portable, transportable, installed in a vehicle (of aviation, maritime, and/or land), or may be adapted and/or configured to operate locally, and/or may operate in a distributed form on the earth and/or at any other locations in space. The "UE" and "terminal" used herein may also be a communication terminal, an Internet terminal, a music/video playing terminal, such as a PDA, a MID (Mobile Internet Device), and/or a mobile phone having a music/video playback function, or a smart TV, a set-top box and other devices. In addition, the "UE" and "terminal" may also be replaced with "user" and "user equipment".

FIG. 1 illustrates an example wireless communication system 100 to which an exemplary embodiment of the present disclosure may be applied, in which the UE detects indication information. The wireless communication system 100 includes one or more fixed infrastructure units, forming a network distributed over a geographical area. The infrastructure unit may also be referred to as an AP (Access Point), an AT (Access Terminal), a BS (Base Station), a Node-B, an eNB (evolved NodeB), and a gNB (next-generation Base Station) or other terms used in the art. As shown in FIG. 1, one or more infrastructure units 101 and 102 provide services to several MSs (mobile stations) or UEs or terminal devices or users 103 and 104 in the serving area. For example, the serving area is within a cell or a sector of a cell. In some systems, one or more BSs may be communicatively coupled to a controller forming an access network, and the controller may be communicatively coupled to one or more core networks. The present disclosure is not limited to any specific type of wireless communication system.

In the time domain and/or frequency domain, the infrastructure units 101 and 102 transmit downlink (DL) communication signals 112 and 113 to the UEs 103 and 104, respectively. The UEs 103 and 104 communicate with one or more infrastructure units 101 and 102 through uplink (UL) communication signals 111 and 114, respectively. In one embodiment, the mobile communication system 100 is an OFDM (Orthogonal Frequency Division Multiplexing)/OFDMA (Orthogonal Frequency Division Multiple Access) system including a plurality of base stations and a plurality of UEs. The plurality of base stations include the base station 101 and the base station 102, and the plurality of UEs include the UE 103 and the UE 104. The base station 101 communicates with the UE 103 through an uplink communication signal 111 and a downlink communication signal 112. When the base station has downlink packets to be transmitted to the UEs, each UE will obtain a downlink allocation (resources), such as a set of radio resources in a PDSCH or an NPDSCH. When the UE needs to transmit packets to the base station in the uplink, the UE obtains a grant from the base station, wherein the grant allocates a PUSCH (Physical Uplink Shared Channel) or an NPUSCH (Narrowband PUSCH) containing a set of uplink radio resources. The UE obtains downlink or uplink scheduling information from the PDCCH or MPDCCH (MTC PDCCH) or EPDCCH (Enhanced PDCCH) or NPDCCH (Narrowband PDCCH) specific to itself. In the following description herein, the PDSCH, PDCCH, and PUSCH are used to indicate the above channels. The downlink or uplink scheduling information and other control information carried by the downlink control channel are called DCI. FIG. 1 also shows different physical channels by taking the downlink 112 and uplink 111 as examples. The downlink 112 includes PDCCH or EPDCCH or NPDCCH or MPDCCH 121, PDSCH or NPDSCH 122, PCFICH (Physical Control Formation Indicator Channel) 123, PMCH (Physical Multicast Channel) 124, PBCH (Physical Broadcast Channel) or NPBCH (Narrowband Physical Broadcast Channel) 125, PHICH (Physical Hybrid Automatic Repeat Request Indicator Channel) 126 and PSS (Primary Synchronization Signal), SSS (Secondary Synchronization Signal), or NPSS/NSSS (Narrowband Primary Synchronization Signal/Secondary Synchronization Signal) 127. The downlink control channel 121 transmits a downlink control signal to the user. The DCI 120 is carried by the downlink control channel 121. The PDSCH 122 transmits data information to the UE. The PCFICH 123 transmits information for decoding the PDCCH, e.g., for dynamically indicating the number of symbols used by the PDCCH 121. The PMCH 124 carries the broadcast multicast information. The PBCH or NPBCH 125 carries an MIB (Master Information Block), which is used for UE early discovery and cell-wide coverage. The PHICH carries the HARQ information, which indicates whether the base station has correctly received the transmitted signal. The uplink 111 includes a PUCCH (Physical Uplink Control Channel) 131 carrying UCI (Uplink Control Information) 130, a PUSCH 132 carrying uplink data information, and a PRACH (Physical Random Access Channel) 133 carrying random access information. In the NB-IoT system, no NPUCCH is defined, and the NPUSCH format 2 is used to transmit the UCI 130.

In one embodiment, the wireless communication network 100 uses an OFDMA or multi-carrier architecture, including AMC (Adaptive Modulation and Coding) on the downlink and a next-generation single-carrier FDMA architecture or multi-carrier OFDMA architecture for UL transmission. The FDMA single-carrier architecture includes IFDMA (Interleaved FDMA), LFDMA (Localized FDMA), DFT-SOFDM (Discrete Fourier Transform-Spread OFDM) of IFDMA or LFDMA. In addition, it also includes various enhanced NOMA (Non-Orthogonal Multiple Access) architectures of the OFDMA system, such as PDMA (Pattern Division Multiple Access), SCMA (Sparse Code Multiple Access), MUSA (Multi-User Shared Access), LCRS FDS (Low Code Rate Spreading Frequency Domain Spreading), NCMA (Non-orthogonal Coded Multiple Access), RSMA (Resource Spreading Multiple Access), IGMA (Interleave-Grid Multiple Access), LDS-SVE (Low Density Spreading With Signature Vector Extension), LSSA (Low Code Rate And Signature Based Shared Access), NOCA (Non-Orthogonal Coded Access), DMA (Interleave Division Multiple Access), RDMA (Repetition Division Multiple Access), GOCA (Group Orthogonal Coded Access), WSMA (Welchbound equality based Spread MA), etc.

In the OFDM system, remote units are served by allocating downlink or uplink radio resources that typically include a set of subcarriers on one or more OFDM symbols. The exemplary OFDMA protocols include the LTE and IEEE 802.16 standards, which are developments of the 3GPP UMTS standards. The architecture may also include use of transmission technologies, such as MC-CDMA (Multi-Carrier CDMA), MC-DS-CDMA (Multi-Carrier Direct Sequence Code Division Multiple Access), one-dimensional or two-dimensional transmission OFCDM (Orthogonal Frequency and Code Division Multiplexing). Alternatively, it may be based on simpler time and/or frequency division multiplexing/multiple access technologies, or a combination of these different technologies. In an optional embodiment, the communication system may use other cellular communication system protocols, including but not limited to TDMA (Time Division Multiplexing Access) or DS-CDMA.

The PDCCH in the following embodiments may also be EPDCCH, MPDCCH, NPDCCH, and NR-PDCCH; the PDSCH may also be EPDSCH, MPDSCH, NPDSCH, NR-PDSCH; the PUSCH in the following embodiments may also be EPUSCH, MPUSCH, NPUSCH, NR-PUSCH. The PDSCH/PUSCH in the following embodiments may be a PDSCH/PUSCH for unicast traffic or a PDSCH/PUSCH for carrying multicast traffic, for example, a PDSCH carrying an SC-MCCH (Single Cell Multicast Control Channel) or an SC-MTCH (Single Cell Multicast Traffic Channel).

Unless specified otherwise, a sub-frame in the following embodiments may also be a BL/CE (Bandwidth-reduced Low-complexity/Coverage Enhanced) sub-frame, a BL/CE downlink sub-frame, a BL/CE valid sub-frame, a BL/CE downlink valid sub-frame, a NB-IoT sub-frame, a NB-IoT downlink subframe, a NB-IoT valid subframe, a NB-IoT downlink valid subframe, a time slot, a NB-IoT time slot, a NR time slot, a TTI (Transmission Time Interval).

In the following embodiments, information configured by the base station, indicated by the signaling, configured by the higher layer, or pre-configured may include a set of configuration information; or include multiple sets of configuration information, from which the UE selects, according to a predefined condition, a set of configuration information for use; or include a set of configuration information including a plurality of subsets, from which the UE selects, according to a predefined condition, a subset for use.

There are at least two systems in the wireless communication system to which the embodiments of the present disclosure are applied, which are referred to as a first system and a second system hereinafter. The frequency domain resources used by the first system and the second system at least partially overlap with each other. It should be noted that the expressions of the first system and the second system are used here only to distinguish two systems. The two systems are interchangeable. For example, the second system may be referred to as a first system, and the first system may be referred to as a second system.

In an exemplary embodiment, the bandwidth of the first system is greater than or equal to the bandwidth of the second system, and the frequency domain resources of the second system are a part of the bandwidth in the first system, as shown in FIG. 2. In another exemplary embodiment, the bandwidth of the second system is greater than or equal to the bandwidth of the first system.

In a specific example, the first system is an NR system, and the second system is an LTE system, specifically, an LTE-MTC system or an NB-IoT system.

In the current LTE system, the downlink DC subcarrier is vacant, and in the current NR system, no special processing is performed on the downlink DC subcarrier that is different from the processing on other downlink subcarriers. Therefore, when the LTE system and the NR system coexist, the LTE system and the NR system cannot completely achieve the alignment of resource block (RB) grids due to different processing on the downlink DC subcarriers. As a specific example, if a narrowband frequency domain position of the LTE-MTC system includes the central PRB (Physical Resource Block) of the LTE, that is, the position of the downlink DC subcarrier, one narrowband will actually include 73 subcarriers of 6 PRBs, including 12 subcarriers of each PRB and 1 downlink DC subcarrier. For example, when the bandwidth of the LTE-MTC terminal is the minimum system bandwidth of 1.4 MHz, the LTE-MTC narrowband will occupy the middle 6 PRBs, particularly, the downlink DC subcarrier and 36 subcarriers on each of both sides of the downlink DC subcarrier.

In the case where the LTE system and the NR system cannot completely achieve the RB grid alignment, one narrowband of the LTE-MTC including the downlink DC subcarrier will always affect the 7 RBs of the NR. If the RBs of the LTE-MTC narrowband on two frequency domain edges, that is, the highest PRB and lowest PRB in the frequency domain of the LTE-MTC narrowband, are not aligned with the RB grid of the NR, the 6 PRBs of the LTE-MTC in the frequency domain will completely overlap with 5 RBs of the NR and partially overlap with other 2 RBs of the NR. Even if the RBs of the LTE-MTC narrowband on one frequency domain edge can be aligned with the RB grid of the NR, the RBs on the other frequency domain edge and the NR RBs will offset by 1 subcarrier, wherein the 1 subcarrier is located in the 7-th RB of the NR. There may be mutual interference. Therefore, according to the coexistence mechanism based on resource reservation in the existing system, if the frequency domain resources of the 7-th RB are reserved in the NR system, the frequency domain resources of the remaining 11 subcarriers in the RB will be wasted; otherwise, if the frequency domain resources of the 7-th RB are not reserved in the NR system, the partial overlapping of RBs of the NR and the LTE-MTC system will cause degradation to the performance of the two systems.

A more general example including the above case is that in the two coexisting communication systems, the frequency domain resources used by the first system and the second system overlap at the subcarrier level, and additional collision avoidance measures need to be taken to avoid collisions between the transmissions of the first system and the second system on the overlapped frequency domain resources. It should be additionally noted that the overlapping at the subcarrier level may exist independently. For example, the above scenario where the LTE-MTC narrowband is deployed within the NR bandwidth may be considered as the frequency domain resource overlapping of 73 subcarriers; the overlapping at the subcarrier level may also occur with the overlapping at the RB level or with other time domain/frequency domain resource overlapping. For example, the above scenario where the LTE-MTC narrowband is deployed in the NR bandwidth may be considered as the frequency domain resource overlapping of 6 RBs plus 1 subcarrier.

FIG. 3 schematically illustrates a transmission method 300 according to an embodiment of the present disclosure. The transmission method 300 may be performed at a terminal device in one of the first system and the second system which have frequency domain resources that at least partially overlap with each other. As shown in FIG. 3, the transmission method according to the embodiment of the present disclosure includes step S310 of obtaining information about overlapped frequency domain resources; step S320 of determining the overlapped frequency domain resources, wherein the determined overlapped frequency domain resources include frequency domain resources overlapping at a subcarrier level; and step S330 of avoiding performing an uplink transmission and/or avoiding monitoring a downlink transmission on the determined overlapped frequency domain resources.

In an exemplary embodiment, the frequency domain resources used by the first system and the second system overlap at the subcarrier level. By determining the overlapped frequency domain resources, and notifying the overlapped frequency domain resources in the first system and/or the second system, the base stations and/or terminals in the first system and/or the second system are enabled to puncture the overlapped frequency domain resources or perform rate matching around the overlapped frequency domain resources, and/or process the overlapped frequency domain resources as reserved resources or invalid resources, to avoid transmission conflicts between the first system and the second system.

In an exemplary embodiment, step S320 of determining the overlapped frequency domain resources may include one of or any combination of:

using predefined overlapped frequency domain resources;

determining the overlapped frequency domain resources according to a first predetermined condition; and determining the overlapped frequency domain resources according to a configuration.

In an exemplary embodiment, the determining the overlapped frequency domain resources according to the first predetermined condition includes: determining, according to received indication information, whether the first system and/or the second system is a predetermined communication system, and/or whether time domain and/or frequency domain resources used by the first system and/or the second system meet a second predetermined condition; and if so, determining predefined frequency domain resources corresponding to the predetermined communication system and/or the second predetermined condition as the overlapped frequency domain resources. For example, the first predetermined condition is whether there is coexistence with any other communication system or with a specific communication system. For the scenario where there is the coexistence, the predefined frequency domain resources are used as the determined overlapped frequency domain resources.

In an exemplary embodiment, the positions of the overlapped frequency domain resources are relative positions in the first system and/or the second system, e.g., the highest and/or lowest several subcarriers in the second system; or absolute positions indicated by RB indexes and/or subcarrier indexes.

In an exemplary embodiment, whether to puncture the overlapped frequency domain resources or to perform rate matching around the overlapped frequency domain resources is determined according to a predefined criterion. For example, the overlapped frequency domain resources are always punctured; or the rate matching is always performed around the overlapped frequency domain resources; or the overlapped frequency domain resources are punctured when a specific condition is met, otherwise the rate matching is performed around the overlapped frequency domain resources. The specific condition may be based on the number of repetitions. In a specific example, the specific condition is that the number of repetitions is greater than 1.

In a specific example, the first system is an NR system, and the second system is an LTE-MTC system. The frequency domain resources of the NR system and the LTE-MTC system partially overlap with each other. In the NR system, the base station indicates the positions of the overlapped frequency domain resources, and the terminal obtains the corresponding information indicated by the base station, so that the base station and/or the terminal in the NR system punctures the overlapped frequency domain resources or performs rate matching around the overlapped frequency domain resources. In another specific example, in the LTE-MTC system, the base station indicates the positions of the overlapped frequency domain resources, and the terminal obtains the corresponding information indicated by the base station, so that the base station and/or the terminal in the LTE-MTC system punctures the overlapped frequency domain resources or performs rate matching around the overlapped frequency domain resources, and/or processes the overlapped frequency domain resources as reserved resources or invalid resources.

In an exemplary embodiment, the overlapped frequency domain resources are determined according to whether a predetermined condition is met. Specifically, the predetermined condition is that in the two coexisting systems, the first system is an NR system, and/or the second system is an LTE-MTC system, and/or, the frequency domain resources used by the second system include LTE downlink DC subcarriers; or the overlapped frequency domain resources are predefined, specifically, are N subcarriers at the highest position and/or the lowest position in the frequency domain resources of the second system.

In another exemplary embodiment, the determining the overlapped frequency domain resources according to the configuration includes: obtaining, by the UE, the configuration indicated by the base station via a higher layer signaling and/or via a physical layer signaling (for example, a downlink control signaling DCI, an uplink control signaling UCI, a signal/channel carrying HARQ-ACK feedback); and determining the overlapped frequency domain resources according to the configuration.

In another exemplary embodiment of the present disclosure, the determining the overlapped frequency domain resources according to the configuration includes: determining the overlapped frequency domain resources according to the configuration indicated in a higher layer signaling and/or a physical layer signaling.

In an exemplary embodiment, the configuration is indicated in the higher layer signaling, and the physical layer signaling carries an indication of whether the configuration is activated on resource positions associated with the physical layer signaling. The associated resource positions may be all of the associated resource positions, or a specific subset of the associated resource positions, or specific resource position(s) indicated in the DCI. In a specific example, the physical layer signaling is DCI for scheduling the uplink/downlink transmission in the first system, and the resource positions associated with the DCI are resource positions for performing the uplink/downlink transmission. When there is a transmission in the second system on at least a part of resources at the resource positions associated with the DCI, the DCI indicates that the configuration is activated at all of the resource positions associated with the DCI or on the part of resources; otherwise, when there is no transmission in the second system on any of resources at the resource positions associated with the DCI, the DCI indicates that the configuration is deactivated at all of the resource positions associated with the DCI. In another specific example, the physical layer signaling is DCI for scheduling the uplink/downlink transmission in the first system, and the resource positions associated with the DCI are a specific subset of relative positions of the resource positions for performing the uplink/downlink transmission indicated in the DCI. In another specific example, the physical layer signaling is DCI for scheduling the uplink/downlink transmission in the first system, and the resource positions associated with the DCI are specific resource positions explicitly indicated in the DCI.

The advantage of the above methods is that the transmission in the second system may not occur on all of the time domain resources; when the second system does not transmit on specific time domain resources, there is actually no conflict between the first system and the second system, and the first system does not actually need to process the overlapped frequency domain resources. Considering whether the transmission occurs in the second system may be dynamically scheduled by the base station, a dynamic indication in the physical layer signaling (such as DCI) of whether to enable a semi-static configuration indicated in the higher layer signaling may meet the actual requirements on the coexistence of the two types of systems better.

In an exemplary embodiment, the determining the overlapped frequency domain resources according to the configuration includes: determining the overlapped frequency domain resources according to a bitmap in a received signaling, the bitmap including a subcarrier-level bitmap.

In an exemplary embodiment, the base station indicates a bitmap of a length being the number of subcarriers in one RB, wherein each bit corresponds to one subcarrier in one RB, and a subcarrier corresponding to a specific bit indicating "0" overlaps with other coexisting communication system(s); otherwise, a subcarrier corresponding to a specific bit indicating "1" does not overlap with other coexisting communication system(s). A frequency domain position of an RB corresponding to the bitmap is predefined. For example, it is derived by a predefined method according to the frequency domain positions of the second system; or the bitmap is used for each RB of the frequency domain resources of the second system; or a frequency domain position of an RB corresponding to the bitmap is configured by the base station.

Further, the indication method may be used in combination with the resource reservation mechanism in the existing mechanism. For example, the overlapped frequency domain resources are indicated as reserved resources or unavailable resources, and/or the overlapped frequency domain resources may be punctured or rate matching may be performed around the overlapped frequency domain resources, in order to avoid conflicts between the transmissions of the first system and the second system on the overlapped frequency domain resources. In the existing mechanism, when the NR and the LTE coexist, the base station in the NR system indicates a block of reserved resources by indicating a triplet bitmap {Bitmap-1, Bitmap-2, Bitmap-3}, wherein Bitmap-1 is resource reservation at the RB level, Bitmap-2 is resource reservation at the symbol level, and Bitmap-3 is resource reservation at the subframe level. As a method used in combination, the base station indicates a quadruple bitmap {Bitmap-1, Bitmap-2, Bitmap-3, Bitmap-4} in the first system and/or the second system, wherein Bitmap-1 to Bitmap-3 are the same as in the existing mechanism, and Bitmap-4 is a bitmap of a length being the number of subcarriers in one RB, which is used as subcarrier-level resource reservation indication information for indicating a reservation situation of each subcarrier in some RB. As a specific example, when some block of physical time-frequency resources (for example, physical resources corresponding to a specific subcarrier in a specific RB and an OFDM symbol in a specific subframe in the frequency domain) are indicated in the quadruple bitmap as reserved resources, the physical time-frequency resources are considered as being reserved.

In another exemplary embodiment, the base station indicates, via a signaling, the positions of the actual overlapped frequency domain resources in a predefined number of possible overlapped positions. For example, 1 bit in the higher layer signaling is used for indicating two possible overlapped positions. In a specific example, the two possible overlapped positions are respectively N lowest subcarriers in the frequency domain of the second system and N highest subcarriers in the frequency domain of the second system, where N is a positive integer not greater than M, and M is 12 (corresponding to 12 subcarriers in one RB) or 72 or 73 (corresponding to 72 or 73 subcarriers in the overlapped LTE-MTC narrowband).

In a specific example, the first system is an NR system, and the second system is an LTE-MTC system. In the NR system, the base station indicates the positions of the overlapped frequency domain resources, and the terminal obtains the corresponding information indicated by the base station, so that the base station and/or the terminal in the NR system punctures the overlapped frequency domain resources or performs rate matching around the overlapped frequency domain resources, in order to avoid conflicts between the transmissions of the NR system and the LTE-MTC system. The base station and/or the terminal in the NR system determine frequency domain resources that overlap with those in the LTE-MTC system according to the indicated positions of the overlapped frequency domain resources. For example, in the NR system, the base station indicates the overlapped frequency domain resources as reserved resources by indicating a quadruple bitmap {Bitmap-1, Bitmap-2, Bitmap-3, Bitmap-4}; or in the NR system, the base station indicates the frequency domain positions of the LTE-MTC system, the base station and/or the terminal determine the relative positions of the overlapped frequency domain resources in the LTE-MTC system according to the predefined criterion and/or the indication information of the base station, thereby deriving the relative or absolute positions of the overlapped frequency domain resources in the NR system; or it is determined, according to the predefined criterion, that when the NR and the LTE-MTC coexist, the adjacent N subcarriers on the top of the highest RB or the adjacent N subcarriers at the bottom of the lowest RB in the frequency domain that are indicated by the base station as reserved resources are frequency domain resources overlapping with those in the LTE-MTC.

When the number of repetitions of the transmission in the NR system is equal to 1, rate matching is performed around the overlapped frequency domain resources or reserved resources; and when the number of repetitions is greater than 1, the overlapped frequency domain resources or reserved resources are punctured.

In another specific example, the first system is an NR system, and the second system is an LTE-MTC system. In the LTE-MTC system, the base station indicates the positions of the overlapped frequency domain resources, so that the base station and/or the terminal in the LTE-MTC system punctures the overlapped frequency domain resources or performs rate matching around the overlapped frequency domain resources, in order to avoid conflicts between the transmissions of the NR system and the LTE-MTC system. The base station and/or the terminal in the LTE-MTC system determine the frequency domain resources that overlap with those in the NR system according to the indicated positions of the overlapped frequency domain resources. For example, the relative positions of the overlapped frequency domain resources in the LTE-MTC system, such as the highest N subcarriers or the lowest N subcarriers in the frequency domain, are determined according to the predefined criterion and/or the indication information of the base station. When the number of repetitions of the transmission in the LTE-MTC system is equal to 1, rate matching is performed around the overlapped frequency domain resources or reserved resources; and when the number of repetitions is greater than 1, the overlapped frequency domain resources or reserved resources are punctured.

FIG. 3 also shows that the transmission method according to an embodiment of the present disclosure further includes step S340 of obtaining a configuration of a frequency domain position of a starting subcarrier of RBs, and step S350 of shifting frequency domain positions of the RBs according to the determined overlapped frequency domain resources and/or the configuration of the frequency domain position of the starting subcarrier of the RBs, so that the frequency domain resources of the first system and the second system do not overlap any more.

In an exemplary embodiment, the frequency domain resources of the first system and the second system overlap at the subcarrier level. By configuring the frequency domain position of the starting subcarrier of the RBs by the base station in the first system and/or the second system, the base station and/or the terminal in the first system and/or the second system are enabled to shift the frequency domain positions of the RBs, so as to avoid conflicts between the transmissions of the first system and the second system.

The determining the configuration of the frequency domain position of the starting subcarrier of the RBs includes determining at least one of: whether to enable a feature of adjusting the frequency domain position of the starting subcarrier, an offset of the frequency domain position of the starting subcarrier (simply called a starting subcarrier offset), a shifting direction of the starting subcarrier, a range of RBs of which the frequency domain position of the starting subcarrier is adjusted, a type of the first system and/or the second system, positions of the frequency domain resources of the first system and/or the second system, a position of a center frequency point or a DC subcarrier of the first system and/or the second system, or whether all or specific frequency domain resources of the first system and/or the second system include the DC subcarrier. For example, the base station configures to enable the feature of adjusting the position of the starting subcarrier, and configures the starting subcarrier offset to be N subcarriers; the base station and/or the terminal shift the position of the starting subcarrier of the RBs by N subcarriers in a specific direction; or, the base station configures the type of the first system and/or the second system, and configures the position of the DC subcarrier of the first system and/or the second system; the base station and/or the terminal determine that the starting subcarrier offset is N subcarriers when the frequency domain resources of the second system include the DC subcarrier according to a predefined criterion, and shift the position of the starting subcarrier of the RBs by N subcarriers in a specific shifting direction. As a special example, when the starting subcarrier offset is 0, the frequency domain position of the starting subcarrier is not actually shifted. In an exemplary embodiment, the offset may take a positive or negative value, and the actual shifting direction may be determined in connection with a predefined/configured shifting direction. For example, if the offset is positive N subcarriers and the shifting direction is upwards, the actual shift is to shift the position of the starting subcarrier of the RBs upwards by N carriers; and if the offset is negative N subcarriers and the shifting direction is upwards, the actual shift is to shift the position of the starting subcarrier of the RBs downwards by N carriers.

According to an embodiment of the present disclosure, the adjusted RBs are all of the uplink and/or downlink RBs in the system bandwidth of the first system and/or the second system, or are specific uplink and/or downlink RBs in the system bandwidth determined according to at least one of: a predefined criterion, the determined overlapped frequency domain resources, or the determined configuration of the frequency domain position of the starting subcarrier of the RBs.

In an exemplary embodiment, the step S350 of shifting the frequency domain positions of the RBs according to the determined overlapped frequency domain resources and/or the configuration of the frequency domain position of the starting subcarrier of the RBs specifically includes:

determining, according to the configuration of the frequency domain position of the RB starting subcarrier, at least one of: the offset of the RB starting subcarrier, the shifting direction, the range of RBs of which the frequency domain position of the starting subcarrier is adjusted; shifting the frequency domain position of the starting subcarrier of the range of RBs by the offset towards the shifting direction; and determining the shifted frequency domain position of the range of RBs according to the shifted position of the starting subcarrier.

In an exemplary embodiment, the offset may be a positive or negative value, and the actual shifting direction may be determined in connection with the determined shifting direction.

According to an embodiment of the present disclosure, the adjusted RBs are all of the uplink and/or downlink RBs in the system bandwidth of the first system and/or the second system, or are specific uplink and/or downlink RBs in the system bandwidth determined according to at least one of: a predefined criterion, the determined overlapped frequency domain resources, or the determined configuration of the frequency domain position of the starting subcarrier of the RBs.

In an exemplary embodiment, the shifting the frequency domain positions of the RBs of the base station and/or the terminal in the first system and/or the second system may include: shifting frequency domain positions of the starting subcarriers of all the RBs in the system bandwidth of the system corresponding to the base station by respective offsets towards a specific shifting direction and/or determining, according to the predefined criterion and/or the configuration information of the frequency-domain position of the starting sub-carrier of the RBs, the frequency resources to which the offset of the starting subcarrier and/or the shifting direction are applied, and shifting the position of the starting subcarrier of all the RBs in the frequency resources to which the offset of the starting subcarrier and/or the shifting direction are applied by the offset towards the shifting direction. The RBs may be RBs in the uplink frequency band or RBs carrying the uplink transmission, and/or may be RBs in the downlink frequency band or RBs carrying the downlink transmission. For example, the base station and/or the UE uses all the RBs of the first system which are located above the positions of the frequency domain resources of the second system (that is, all the RBs of the first system whose frequency domain positions are higher than those of all the RBs of the second system) and/or all the RBs of the first system which are located below the positions of the frequency domain resources of the second system (that is, all the RBs of the first system whose frequency domain positions are lower than those of all the RBs of the second system) as the frequency domain resources to which the starting subcarrier offset is applied, according to the predefined criterion and the positions of the frequency domain resources in the second system among the configuration information of the frequency domain position of the starting subcarrier of the RBs. The RBs are RBs in the downlink frequency band or RBs carrying the downlink transmission, and/or, the RBs are RBs in the uplink frequency band or RBs carrying the uplink transmission.

The base station may provide one or more sets of configuration information. For example, the base station provides a set of configuration information for all RBs in the system bandwidth, or the base station provides multiple sets of configuration information and each set of configuration information is used for a set of RBs.

In a specific example, the first system is an NR system, and the second system is an LTE-MTC system. The base station and the terminal in the NR system are enabled to shift the frequency domain positions of the RBs by the base station in the NR system configuring the frequency position of the starting subcarrier of the RBs, so as to avoid conflicts between the transmissions of the NR system and the LTE-MTC system.

In an exemplary embodiment, as shown in FIG. 4, the first system is an NR system, and the second system is an LTE-MTC system. In the NR system, the configuration information of the base station on the frequency domain position of the starting subcarrier of the RBs includes:

enabling the feature of adjusting the position of the starting subcarrier; positions of the frequency domain resources of the first system and the second system; wherein the positions of the frequency domain resources of the second system start from the starting position of Subcarrier #0 in the frequency domain RB #M+1 in the first system (that is, the boundary of the lowest RB of the second system in the frequency domain and the boundary of the NR RBs are aligned), to the starting position of Subcarrier #1 in the frequency domain RB #M+7 in the first system (that is, including Subcarrier # 0 of RB #M+7 but excluding Subcarrier #1 of RB #M+7);

the type of the second system being an LTE-MTC system;

the position of the DC subcarrier of the second system being within the configured frequency domain resources of the second system (that is, from Subcarrier #0 of RB #M+1 to Subcarrier #0 of RB #M+7 of the first system); or the DC subcarrier being included in the frequency domain resources of the configured second system.

The base station and the terminal of the NR system determining the offset of the starting subcarrier, the shifting direction, and the frequency domain resources to which the shifting of the starting subcarrier is applied based on the content of the configuration information of the frequency domain position of the starting subcarrier of the RBs and the predefined criterion includes: shifting all of the frequency domain resources in the NR system bandwidth that are not lower than RB #M+7 upwards by one subcarrier.

The base station and the terminal of the NR system shift the position of the starting subcarrier of the RBs as discussed above by one subcarrier.

In this exemplary embodiment, before shifting, the NR resources that overlap with the frequency domain resources of the LTE-MTC include 1 subcarrier (Subcarrier #0) of RB #M+1 and RB #M+1 to RB #M+6. Thus, the frequency domain resources of RB #M+1 to RB #M+6 should be configured as reserved. However, if RB #M+7 is configured as reserved, 11 subcarriers of the non-overlapped part are wasted; otherwise, if RB #M+7 is not configured as reserved, there may be a conflict between the NR system and the LTE-MTC system on the overlapped 1 subcarrier. After shifting, the subcarriers of RB #M+7 do not overlap with the frequency domain resources of the LTE-MTC any more. RB #M+7 does not need to be configured as reserved, and may be used for the transmission in the NR normally.

In another exemplary embodiment, as shown in FIG. 5, the first system is an NR system, and the second system is an LTE-MTC system. In the NR system, the configuration information of the base station on the frequency domain position of the starting subcarrier of the RBs includes:

enabling the feature of adjusting the position of the starting subcarrier;

positions of the frequency domain resources of the first system and the second system; wherein the positions of the frequency domain resources of the second system start from the starting position of Subcarrier #N1+1 in the frequency domain RB #M+1 in the first system (that is, including Subcarrier #N1+1 but excluding Subcarrier #N1), to the starting position of Subcarrier #N2 in the frequency domain RB #M2 in the first system (that is, including Subcarrier #N2−1 but excluding Subcarrier #2);

the offset of the starting subcarrier being N, where N is a positive integer not greater than M, or N is any positive integer. For example, when N is not greater than M and M=12, the range of the offset of the starting subcarrier does not exceed one RB; when N is any positive integer, the range of the offset of the starting subcarrier may be several sub carriers of more than one RB; where N may be a value, or a set of (more than one) values; for example, in this exemplary embodiment, N={N1', N2'}, and N1'=11−N1, N2'=N2.

The base station and the terminal of the NR system determining the offset of the starting subcarrier and the corresponding shifting direction based on the content of the configuration information of the frequency domain position of the starting subcarrier of the RBs includes: shifting N1' subcarriers downwards and/or shifting N2' subcarriers upwards. In a specific example, if the range of shifting the RBs needs to be limited to no more than 1 RB, the offset of the starting subcarrier and the corresponding shifting direction are shifting mod (N1'+1, 12) subcarriers downwards and/or shifting mod (N2', 12) subcarriers upwards.

The base station and the terminal of the NR system determine, according to the predefined criterion and the content of the configuration information of the frequency domain position of the starting subcarrier of the RBs, that the frequency domain resources shifted by N1' subcarriers downwards are all the frequency domain resources in the bandwidth of the NR system whose frequency domain positions are not higher than RB #M1, and/or the frequency domain resources shifted by N2' subcarriers upwards are all the frequency domain resources in the bandwidth of the NR system whose frequency domain positions are not lower than RB #M2.

The base station and the terminal of the NR system shift the frequency domain position of the start subcarrier of the RBs as discussed above by an offset towards a shifting direction.

In this exemplary embodiment, before shifting, the frequency domain resources of the NR ranging from Subcarrier #N1+1 of RB #M1 to Subcarrier #N2−1 of RB #M2 overlap with the frequency domain resources of the LTE-MTC. That is, the NR resources that overlap with the frequency domain resources of the LTE-MTC include a part of subcarriers of RB #M1, a part of subcarriers of RB #M2, and RB #M1+1 to RB #M2−1. Thus, the frequency domain resources from RB #M1+1 to RB #M2−1 should be configured as reserved. However, if RB #M1 and RB #M2 are configured as reserved, the non-overlapped subcarriers are wasted; otherwise, if RB #M1 and RB #M2 are not configured as reserved, there may be a conflict between the NR and the LTE-MTC system on the overlapped part. After shifting, the subcarriers of RB #M1 and RB #M2 do not overlap with the frequency domain resources of the LTE-MTC anymore. RB #M1 and RB #M2 do not need to be configured as reserved, and may be used for the transmission in the NR normally.

FIG. 6 schematically illustrates a transmission method 600 according to an embodiment of the present disclosure. The transmission method 600 may be performed at a base station in one of the first system and the second system which have frequency domain resources that at least partially overlap with each other. As shown in FIG. 6, the transmission method according to the embodiment of the present disclosure includes step S610 of determining overlapped frequency domain resources, the determined overlapped frequency domain resources including frequency domain resources overlapping at a subcarrier level; step S620 of notifying the overlapped frequency domain resources; and step S630 of avoiding performing a downlink transmission and/or avoiding monitoring an uplink transmission on the determined overlapped frequency domain resources, and/or configuring a terminal device to avoid performing an uplink transmission and/or to avoid monitoring a downlink transmission on the determined overlapped frequency domain resources.

Other exemplary embodiments as described above in connection with FIG. 3 are also applicable to the method 600 as shown in FIG. 6.

In an exemplary embodiment, the determining the overlapped frequency domain resources includes one of or any combination of:

using predefined overlapped frequency domain resources;

determining the overlapped frequency domain resources according to a first predetermined condition; and determining the overlapped frequency domain resources according to a configuration.

In an exemplary embodiment, the determining the overlapped frequency domain resources according to the first predetermined condition includes:

determining, according to received indication information, whether the first system and/or the second system is a predetermined communication system, and/or whether time domain and/or frequency domain resources used by the first system and/or the second system meet a second predetermined condition; and if so, determining predefined frequency domain resources corresponding to the predetermined communication system and/or the second predetermined condition as the overlapped frequency domain resources.

In one exemplary embodiment, the predetermined communication system may be an LTE-MTC system.

In an exemplary embodiment, the notifying the overlapped frequency domain resources includes: indicating the overlapped frequency domain resources in a higher layer signaling and/or a physical layer signaling.

In an exemplary embodiment, the notifying the overlapped frequency domain resources includes: indicating the overlapped frequency domain resources in a bitmap in the signaling, the bitmap including a subcarrier-level bitmap.

In an exemplary embodiment, the avoiding performing the uplink transmission and/or avoiding monitoring the downlink transmission on the determined overlapped frequency domain resources includes one of:

puncturing the overlapped frequency domain resources or performing rate matching around the overlapped frequency domain resources, and/or processing the overlapped frequency domain resources as reserved or unavailable resources;

shifting frequency domain positions of RBs according to the determined overlapped frequency domain resources and/or a configuration of a frequency domain position of a starting subcarrier of the RBs, so that the frequency domain resources of the first system and the second system do not overlap any more.

In an exemplary embodiment, the configuration of the frequency domain position of the starting subcarrier of the RBs includes at least one of information on whether to enable a feature of adjusting the frequency domain position of the starting subcarrier, an offset of the frequency domain position of the starting subcarrier, a shifting direction of the starting subcarrier, a range of RBs of which the frequency domain position of the starting subcarrier is adjusted, a type of the first system and/or the second system, positions of the frequency domain resources of the first system and/or the second system, a position of a center frequency point or a DC subcarrier of the first system and/or the second system, or whether all or specific frequency domain resources of the first system and/or the second system include the DC subcarrier.

In an exemplary embodiment, the range of RBs of which the frequency domain position of the starting subcarrier is adjusted is all uplink and/or downlink RBs in a system bandwidth of the first system, or specific uplink and/or downlink RBs in the system bandwidth determined according to at least one of: a predefined criterion, the determined overlapped frequency domain resources, or the determined configuration of the frequency domain position of the starting subcarrier of the RBs.

In an exemplary embodiment, the shifting the frequency domain positions of the RBs according to the determined overlapped frequency domain resources and/or the configuration of the frequency domain position of the starting subcarrier of the RBs includes:

determining, according to the determined overlapped frequency domain resources and/or the configuration of the frequency domain position of the starting subcarrier of the RBs, at least one of: an offset of the starting subcarrier of the RBs, a shifting direction of the starting subcarrier, or a range of RBs of which the frequency domain position of the starting subcarrier is adjusted; and shifting the frequency domain position of the starting subcarrier of the range of RBs by the offset towards the shifting direction, and determining the shifted frequency domain position of the range of RBs according to the shifted position of the starting subcarrier.

In an exemplary embodiment, the first system is one of an LTE-MTC system and an NR system, and the second system is the other of the LTE-MTC system and the NR system.

FIG. 7 schematically illustrates a transmission method 700 according to an embodiment of the present disclosure. The transmission method 700 may be performed at a terminal device in one of the first system and the second system which have frequency domain resources that at least partially overlap with each other. As shown in FIG. 7, the transmission method according to an embodiment of the present disclosure includes step S710 of obtaining configuration information, wherein the configuration information includes a specific signal/channel pattern, the pattern including at least a part of overlapped time-frequency resources; and the configuration information further includes information about the overlapped time-frequency resources, and/or indication information, wherein the indication information includes: information indicating not monitoring a downlink transmission of the specific signal/channel, and/or information indicating not transmitting an uplink transmission of the specific signal/channel; and step 720 of according to the obtained configuration information, performing operations of: not monitoring the downlink transmission of the specific signal/channel, and/or not transmitting the uplink transmission of the specific signal/channel.

In an exemplary embodiment, the specific signal/channel is a specific class of signals/channels or a specific subset of the specific class of signals/channels. In an exemplary embodiment, the specific subset may be the specific class of signals/channels at specific frequency domain positions (or within a specific frequency domain range).

In an exemplary embodiment, the step S720 of according to the obtained configuration information, not monitoring the downlink transmission of the specific signal/channel and/or not transmitting the uplink transmission of the specific signal/channel may further include: not monitoring the downlink transmission of the specific signal/channel at the specific resource positions or not transmitting the uplink transmission of the specific signal/channel at the specific resource positions, and/or not monitoring or transmitting a specific subset of the specific signal/channels.

FIG. 8 schematically illustrates a transmission method 800 according to an embodiment of the present disclosure. The transmission method 800 may be performed at a base station in one of the first system and the second system which have frequency domain resources that at least partially overlap with each other. As shown in FIG. 8, the transmission method according to the embodiment of the present disclosure includes step S810 of notifying configuration information, wherein the configuration information includes a specific signal/channel pattern, the pattern including at least a part of overlapped time-frequency resources; and the configuration information further includes information about the overlapped time-frequency resources, and/or indication information, wherein the indication information includes: information indicating not monitoring a downlink transmission of the specific signal/channel, and/or information indicating not transmitting an uplink transmission of the specific signal/channel; and step S820 of not monitoring the uplink transmission of the specific signal/channel, and/or not transmitting the downlink transmission of the specific signal/channel.

In an exemplary embodiment, the step S820 of not monitoring the uplink transmission of the specific signal/channel, and/or not transmitting the downlink transmission of the specific signal/channel may further include: not monitoring the uplink transmission of the specific signal/channel at the specific resource positions or not transmitting the downlink transmission of the specific signal/channel at the specific resource positions, and/or not monitoring or transmitting a specific subset of the specific signal/channels.

In an exemplary embodiment, the configuration of the specific signal/channel made by the base station may use the existing mechanism; or may use a newly introduced configuration mechanism dedicated to avoid interference of other coexisting communication systems, including using a newly introduced configuration mechanism different from the existing mechanism, or using the existing mechanism but with a newly introduced parameter and/or parameter value.

According to the exemplary embodiment of the present disclosure, since the terminal is configured not to transmit/monitor the specific signal/channel, the base station may also not transmit the specific signal/channel, so that there is no actual transmission at the time-frequency resource positions corresponding to the specific signal/channel. Therefore, the first/second system may indirectly achieve the effect of resource reservation at the subcarrier level by reusing the existing mechanism to a extent, thereby avoiding the conflicts that may occur between the coexisting communication systems.

In a specific example, the first system is an NR system, and the second system is an LTE-MTC system. In the NR system, the time-frequency resources of a PT-RS (Phase Tracking Reference Signal) configured by the base station include subcarriers overlapping with those in the LTE-MTC, and the terminal is configured not to monitor and/or not transmit the PT-RS, and the base station does not transmit or monitor the PT-RS, thereby avoiding the conflicts between the transmissions of the first system and the second system.

The configuration of the time-frequency resources of the PT-RS includes at least one of:

specifying a reasonable value for a PT-RS frequency domain position related parameter in the existing mechanism, so that at least one frequency domain position of the PT-RS is on a subcarrier overlapping with that in the LTE-MTC;

configuring a newly introduced value for at least one frequency domain position related parameter of the PT-RS in the existing mechanism, so that at least one frequency domain position of the PT-RS is on a subcarrier overlapping with that in the LTE-MTC;

using at least one newly introduced parameter for the configuration of the frequency domain positions of the PT-RS in the existing mechanism, including adding an additional parameter or replacing the parameter in the existing mechanism with the newly introduced parameter, so that at least one frequency domain position of the PT-RS is on a subcarrier overlapping with that in the LTE-MTC;

using a newly introduced PT-RS configuration mechanism, for example, the base station directly indicating at least one frequency domain position of the PT-RS, and the at least one frequency domain position of the PT-RS being on a subcarrier overlapping with that in the LTE-MTC;

configuring a value (which is {1,2,4} in the existing mechanism) of a parameter LPT-RS of a PT-RS time domain density in the existing mechanism to be 1, that is, transmitting the PT-RS on each symbol;

wherein the PT-RS which the terminal is configured not to monitor and/or not to transmit is a subset of all configured PT-RSs, for example, PT-RSs on a specific RB; or the PT-RS includes all configured PT-RSs.

wherein the configuring the terminal not to monitor the PT-RS and/or not to transmit the PT-RS may further include:

indicating the terminal to not transmit a DM-RS (Demodulation Reference Signal) and/or not to monitor a DM-RS on the subcarrier corresponding to the PT-RS, wherein the indication may be derived indirectly based on a predefined criterion; for example, the base station configures the terminal not to monitor the PT-RS and/or not to transmit the PT-RS, and the terminal will further not monitor the DMRS and/or not transmit the DMRS on the subcarrier corresponding to the PT-RS.

For this example, a typical scenario is that in the LTE-MTC system, the narrowband which includes the downlink DC subcarrier has 73 subcarriers. The position of the narrowband in the frequency domain may be that: (a) the boundary of the lowest RB of the narrowband in the frequency domain and the boundary of the NR RB are aligned, and the highest RB in the frequency domain and the NR RB have one subcarrier overlapped. The subcarrier is the highest subcarrier (Subcarrier #11) in the LTE-MTC RB and the lowest subcarrier (Subcarrier #0) in the NR RB; or (b) the boundary of the highest RB of the narrowband in the frequency domain and the boundary of the NR RB are aligned, and the lowest RB in the frequency domain and the NR RB have one subcarrier overlapped. The subcarrier is the lowest subcarrier (Subcarrier #0) in the LTE-MTC RB and the highest subcarrier (Subcarrier #11) in the NR RB. Hereinafter, a scenario in (a) is taken as an example for description. By using a method similar to that in the following description, the mechanism used in a scenario in (b) may be derived similarly.

In an exemplary embodiment, the resources occupied by the LTE-MTC system are RB #N+1 RB #N+6 and Subcarrier #0 of RB #N+7. The base station configures time-frequency resources of the PT-RS of the PDSCH and/or PUSCH to include Subcarrier #0 of RB #N+7. The base station configures the terminal not to monitor the PT-RS on RB #N+7 and/or not to transmit the PT-RS on RB #N+7, and the base station itself does not transmit the PT-RS on RB #N+7 either. This mechanism indirectly achieves that the base station and the terminal in the NR system will perform rate matching around Subcarrier #0 in RB #N+7, and the NR system will not perform the transmission on Subcarrier #0.

The base station configuring time-frequency resources of the PT-RS of the PDSCH and/or the PUSCH to include Subcarrier #0 of RB #N+7 specifically includes:

configuring the value (which is {1,2,4} in the existing mechanism) of the parameter LPT-RS of the PT-RS time domain density in the existing mechanism to be 1, that is, transmitting the PT-RS on each symbol.

Configuring at least one frequency domain position of the PT-RS on Subcarrier #0 of RB #N+7 by at least one of: specifying a reasonable value for a frequency domain position related parameter, e.g., nRNTI, of the PT-RS in the existing mechanism; configuring a newly introduced value for at least one frequency domain position related parameter, e.g., $k_{ref}^{RE}$ of the PT-RS in the existing mechanism; using at least one newly introduced parameter for the configuration of the frequency domain position of the PT-RS in the existing mechanism, e.g., replacing nRNTI with another newly introduced RNTI value; additionally indicating, by the base station, a frequency domain position of the PT-RS directly, the frequency domain position being Subcarrier #0 of RB #N+7.

The base station indicates the terminal not to monitor the PT-RS at a specific location and not to transmit the PT-RS at a specific location, and also indicates the terminal not to transmit the DM-RS and/or not to monitor the DM-RS at the specific location. Specifically, the specific position is a subcarrier used by the PT-RS in RB #N+7, or Subcarrier #0 of RB #N+7.

In this exemplary embodiment, since the terminal does not transmit or monitor the PT-RS on Subcarrier #0 of RB #N+7, the base station does not need to transmit or monitor the PT-RS on Subcarrier #0 of RB #N+7. Thus, at least in the transmission symbols/slots of the PDSCH and/or the PUSCH, there is no transmission of the NR system on Subcarrier #0 in RB #N+7. Therefore, the actual effect of this mechanism is to achieve resource reservation at the subcarrier level, thus avoiding conflicts caused by the NR system and the LTE-MTC system transmitting on Subcarrier #0 at the same time, and the remaining 11 subcarriers on the RB #N+7 may be used for NR transmission in a frequency division multiplexing way, thereby improving resource utilization efficiency.

FIG. 9 schematically illustrates a transmission method 900 according to an embodiment of the present disclosure. The transmission method 900 may be performed at a terminal device in one of the first system and the second system which have frequency domain resources that at least partially overlap with each other. As shown in FIG. 9, the transmission method according to the embodiment of the present disclosure includes step S910 of obtaining information about overlapped frequency domain resources, and obtaining information about resource positions occupied by the uplink or downlink signal transmitted periodically in the second system, the uplink or downlink signal transmitted periodically including at least SIB1 and/or NRS; and step S920 of avoiding performing an uplink transmission and/or avoiding monitoring a downlink transmission at the resource positions occupied by the uplink or downlink signal in the second system.

In an exemplary embodiment, the obtaining the information about the overlapped frequency domain resources includes:

obtaining the information about the overlapped frequency domain resources according to a configuration indicated in a higher layer signaling and/or a physical layer signaling, and/or the obtaining the information about the resource positions occupied by the uplink or downlink signal transmitted periodically in the second system includes:

obtaining the information about the resource positions occupied by the uplink or downlink signal transmitted periodically in the second system according to a configuration indicated in a higher layer signaling and/or a physical layer signaling.

In an exemplary embodiment, the avoiding performing the uplink transmission and/or avoiding monitoring the downlink transmission at the resource positions occupied by the uplink or downlink signal in the second system includes:

puncturing the resource positions occupied by the uplink or downlink signal in the second system or performing rate matching around the resource positions occupied by the uplink or downlink signal in the second system, and/or processing the resource positions occupied by the uplink or downlink signal in the second system as reserved resources or unavailable resources.

In an exemplary embodiment, the first system is an NR system, and the second system is an LTE-MTC system, wherein the information about the resource positions occupied by the uplink or downlink signal transmitted periodically in the second system includes at least one of:

an LTE cell ID, an LTE system frame number, an LTE or MTC system bandwidth, a time domain and/or a frequency domain resource position of transmission of SIB1, an SIB1 frequency hopping sequence, a number of downlink narrowbands available for SIB1, or an index of each narrowband.

In an exemplary embodiment, the first system is an NR system, and the second system is an NB-IoT system, wherein the information about the resource positions occupied by the uplink or downlink signal transmitted periodically in the second system includes at least one of:

an LTE cell ID, an LTE system frame number, an LTE or NB-IoT system bandwidth, a frequency domain position of an NB-IoT anchor carrier, a frequency domain position of an NB-IoT non-anchor carrier, whether an anchor carrier or a non-anchor carrier overlaps with NR, an NB-IoT deployment scenario being TDD or FDD, a time domain and/or frequency domain resource position of transmission of SIB1, whether there is an additional SIB1 transmission in the NB-IoT system, a time domain and/or frequency domain resource position used for the additional SIB1 transmission, or a position of NRS transmission on an NB-IoT non-anchor carrier.

In an exemplary embodiment, the information about the position of NRS transmission on the NB-IoT non-anchor carrier includes at least one of: a subframe in which an NRS is transmitted in the NB-IoT system, configuration information about paging search space on the NB-IoT non-anchor carrier, position information about paging PDCCH candidate time-frequency resource on the NB-IoT non-anchor carrier, configuration information about Type 2 common search space for RAR, Type 1A and Type 2A PDCCH configuration information, resource positions of PDSCH of Msg4, resource positions of PDSCH scheduled in G-RNTI or SC-RNTI scrambled DCI, whether the NB-IoT supports a feature introduced in Release 16 that the NRS transmission presents even if there is no NPDCCH transmission on the non-anchor carrier, or NRS configuration information introduced by Release 16 features.

In an exemplary embodiment, the obtaining the information about the overlapped frequency domain resources includes:

obtaining the information about the overlapped frequency domain resources according to a configuration indicated in a higher layer signaling and/or a physical layer signaling; and/or the obtaining the information about the resource positions occupied by the uplink or downlink signal transmitted periodically in the second system includes:

obtaining the information about the resource positions occupied by the uplink or downlink signal transmitted periodically in the second system according to a configuration indicated in a higher layer signaling and/or a physical layer signaling.

FIG. 10 schematically illustrates a transmission method 1000 according to an embodiment of the present disclosure. The transmission method 1000 may be performed at a base station in one of the first system and the second system which have frequency domain resources that at least partially overlap with each other. As shown in FIG. 10, the transmission method according to the embodiment of the present disclosure includes step S1010 of notifying overlapped frequency domain resources, and notifying resource positions occupied by the uplink or downlink signal transmitted periodically in the second system, the uplink or downlink signal transmitted periodically including at least SIB1 and/or NRS; and step S1020 of avoiding performing an uplink transmission and/or avoiding monitoring a downlink transmission at the resource positions occupied by the uplink or downlink signal in the second system.

When there are overlapped frequency domain resources between the LTE system and the NR system, different time domain resources may be allocated to the NR system and the LTE system at the positions of the overlapped resources in a TDM way, in order to avoid conflicts caused by the transmissions of the NR system and the LTE system on the same time-frequency resources.

However, for the resources used for the NR system, it should be noted that in the current LTE system, there are uplink or downlink signals that are transmitted in a certain regular periodicity, which may also be referred to as always-on signals. The terminal of the LTE system may monitor signals that the base station is expected to transmit at these uplink or downlink signal transmission positions. Taking the CRS in the LTE system as an example, the base station periodically transmits the CRS on the determined time-frequency resource pattern according to a predefined mapping rule and CRS parameter related information configured by the base station. The terminal also uses the predefined mapping rule and the CRS parameter related information configured by the base station to determine the transmission positions of the CRS (that is, determines the time-frequency resource pattern used by the CRS) and monitors the CRS. Therefore, the resources used for the NR system need to circumvent the time-frequency resources used by the uplink or downlink signals transmitted in a certain regular periodicity in the LTE system.

For the scenario where the NR system and the LTE system coexist, the prior art includes a mechanism dedicated to avoid collisions with the CRS transmission. Specifically, the NR protocol includes a mechanism that explicitly supports the PDSCH to perform rate matching around the overlapped RE positions in the LTE carrier that are used for CRS transmission. This mechanism requires that the base station configures the terminal with parameters of: an LTE carrier bandwidth and frequency domain positions, a LTE MBSFN (Multicast Broadcast Single Frequency Network) subframe configuration, a number of LTE CRS antenna ports, and a LTE CRS shift. The above information may be indicated by an lte-CRS-ToMatchAround parameter in the higher layer signaling. According to the above parameters configured by the base station, the terminal may derive the overlapped RE positions corresponding to the CRS transmission in the LTE system, and perform rate matching around the RE positions, so that the NR system does not transmit the NR signal at the RE positions of the CRS, thereby avoiding the collision between the NR system and the CRS signals of the LTE system.

For the scenario where the NR system and the LTE-MTC system or the NB-IoT system coexist, it is necessary to further introduce other mechanisms for avoiding conflicts between other signals/channels that are transmitted in a certain regular periodicity, similar with the CRS, of the NR system and the LTE system. Specifically, those mechanisms include a mechanism for avoiding conflicts between the NR system and SIB1s of the LTE-MTC system, and a mechanism for avoiding conflicts between the NR system and NRSs of the LTE NB-IoT system.

The SIB1 in the LTE-MTC system is also called SIB1-BR, in order to be distinguished from the SIB1 in the LTE system. Similarly, the SIB1 in the NB-IoT system is also called SIB1-NB. For ease of description below, the SIB1s in various LTE systems are collectively referred to as SIB1.

In an exemplary embodiment, there are overlapped frequency domain resources between the first system and the second system, and there are uplink or downlink signals transmitted in a certain regular periodicity in the second system; by allocating the first system and the second system with different time domain resources, and indicating, in the first system, the resource positions occupied by the uplink or downlink signals transmitted in a certain regular periodicity in the second system, the base station and/or the terminal in the first system puncture the resource positions occupied by the uplink or downlink signals in the second system, or perform rate matching around the resource positions occupied by the uplink or downlink signals in the second system, and/or process the resource positions occupied by the uplink or downlink signals in the second system as reserved resources or unavailable resources, in order to avoid conflicts between the transmissions of the first system and the second system.

In an exemplary embodiment, the base station in the first system configures the terminal in the first system with information about the transmission parameters of the uplink or downlink signals that are transmitted in a certain regular periodicity in the second system. The terminal in the first system derives, from the information, the time-frequency resource positions corresponding to the uplink or downlink signals that are transmitted in a certain regular periodicity in the second system, and performs rate matching around the time-frequency resource positions. The base station configures the terminal in the first system with related information, including dynamic configuration and static or semi-static configuration. For example, the related information is indicated dynamically in the DCI, or indicated (semi-)statically in the system information, e.g., MIB, SIB, SI, CORESET.

In a specific example, the first system is an NR system, and the second system is an LTE-MTC system. The information configured by the base station of the NR system for the terminal of the NR system includes at least one of: an LTE cell ID, an LTE system frame number, an LTE or MTC system bandwidth, a time domain and/or a frequency domain resource position of transmission of SIB1, an SIB1 frequency hopping sequence, a number of downlink narrowbands available for SIB1, or an index of each narrowband.

The terminal of the NR system derives the time-frequency resource positions corresponding to the SIB1 signal in the LTE-MTC system from the information, and considers that the time-frequency resource positions are configured as reserved resources or unavailable resources, and/or performs rate matching around the time-frequency resource positions.

In another specific example, the first system is an NR system, and the second system is an NB-IoT system. The information configured by the base station of the NR system for the terminal of the NR system includes at least one of: an LTE cell ID, an LTE system frame number, an LTE or NB-IoT system bandwidth, a frequency domain position of an NB-IoT anchor carrier, a frequency domain position of an NB-IoT non-anchor carrier (if there are a plurality of non-anchor carriers, including a frequency domain position of at least one or each non-anchor carrier), whether an anchor carrier or a non-anchor carrier overlaps with NR, an NB-IoT deployment scenario being TDD or FDD, a time domain and/or frequency domain resource position of transmission of SIB1, whether there is an additional SIB1 transmission in the NB-IoT system, a time domain and/or frequency domain resource position used for the additional SIB1 transmission (wherein, whether there is an additional SIB1 transmission and a position used for time domain resources used for the additional SIB1 transmissions may be configured and/or derived based on the number of repetitions of SIB1; and the length of the time domain resources may be indicated by the number of repetitions of SIB1), or a position of NRS transmission on an NB-IoT non-anchor carrier.

In an exemplary embodiment, the information of the position of NRS transmission on the NB-IoT non-anchor carrier configured by the base station of the NR system to the terminal of the NR system includes at least one of: a subframe in which an NRS is transmitted in the NB-IoT system, configuration information about paging search space on the NB-IoT non-anchor carrier, position information about paging PDCCH (Physical Downlink Control Channel) candidate time-frequency resource on the NB-IoT non-anchor carrier, configuration information about Type 2 common search space for RAR, Type 1A and Type 2A PDCCH configuration information, resource positions of PDSCH of Msg4, resource positions of PDSCH scheduled in G-RNTI or SC-RNTI scrambled DCI, whether the NB-IoT supports a feature introduced in Release 16 that the NRS transmission presents even if there is no NPDCCH transmission on the non-anchor carrier, or NRS configuration information introduced by Release 16 features (for example, the number of transmission subframes of the NRS corresponding to Release 16 features, a transmission start subframe, and signals/channels associated with the NRS transmission).

The terminal of the NR system derives the time-frequency resource positions corresponding to the SIB1 signal and/or NRS signal in the NB-IoT system from the information, and considers that the time-frequency resource positions are configured as reserved resources or unavailable resources, and/or, performs rate matching around the time-frequency resource positions.

In an exemplary embodiment, the base station configuring the terminal of the first system with the related information includes: the base station indicating the configuration by a higher layer signaling and/or a physical layer signaling (for example, a downlink control signaling DCI, an uplink control signaling UCI, signal/channels carrying HARQ-ACK feedback), and the terminal obtaining the configuration via the higher layer signaling and/or the physical layer signaling accordingly.

In an exemplary embodiment, the configuration is indicated in the higher layer signaling (for example, MIB, SIB, SI, CORESET), and the physical layer signaling carries an indication of whether the configuration is activated on resource positions associated with the physical layer signaling (which may be all associated resource positions, or a specific subset of associated resource positions, or specific resource position(s) indicated in the DCI). In a specific example, the physical layer signaling is DCI for scheduling the uplink/downlink transmission in the first system, and the resource positions associated with the DCI are resource positions for performing the uplink/downlink transmission. When there is an NRS transmission in the second system on at least a part of resources at the resource positions associated with the DCI, the DCI indicates that the configuration is activated at all of the resource positions associated with the DCI or on the part of resources; otherwise, when there is no NRS transmission in the second system on any of resources at the resource positions associated with the DCI, the DCI indicates that the configuration is deactivated at all of the resource positions associated with the DCI.

The advantage of the above methods is that in the NB-IoT system, there may be dynamic NRS transmissions on the non-anchor carrier. For example, depending on the transmission of the search space NPDCCH, when there is an NPDCCH transmission on the non-anchor carrier, there may be an NRS transmission on the subframe occupied by the NPDCCH or search space candidates and on the previous X subframes and on the next Y subframes; otherwise, there will be no NRS transmission. Therefore, dynamically indicating whether to enable the semi-static configuration indicated in the higher layer signaling in the physical layer signaling (such as DCI) may meet the actual requirements on the coexistence of the NB-IoT system and the NR system better.

In order to further reduce the interference caused by the periodically transmitted signal of one type of system to the other type of system when the two types of systems coexist, one possible method is to reduce the transmission of the periodic signals of the one type of system and compensate for the performance loss caused by reduction of this signal. Taking the coexistence scenario where the LTE-MTC is deployed in the NR system bandwidth as an example, if in the bandwidth occupied by the MTC, the CRS is only transmitted on some of the frequency domain resources, and is not transmitted on other frequency domain resources (as shown in FIG. 11), and the downlink demodulation performance of the bandwidth on which no CRS transmission is performed is compensated for in other ways, it may reduce the interference caused by the CRS on the NR transmission within the bandwidth where the CRS is not transmitted, and does not seriously degrade the performance of the MTC system.

In the Rel-16 LTE-MTC system, a method for improving downlink control channel MPDCCH demodulation performance of MTC by the CRS is discussed. Specifically, channel estimation is performed based on the CRS in conjunction with the DMRS of the MPDCCH by providing an association between the CRS and the DMRS of the MPDCCH (such as the mapping of antenna ports, etc.), so that the CRS may be used for the measurements of the MTC system, which indirectly increases the density of the MPDCCH reference signals and improves the performance of the MPDCCH. A similar method may also be used in the scenario where the MTC and the NR coexist. In the MTC system, the base station provides configuration information about the association between the MTC reference signals and the NR reference signals, so that the reference signals in the NR system may be used for the measurements of the MTC system, thereby reducing a part of the transmissions of reference signals in the MTC system on the premise that the performance is generally kept stable. Similarly, in the NB-IoT system, the base station provides configuration information about the association between the NB-IOT reference signals and the NR reference signals, so that the reference signals in the NR system may be used for the measurements of the NB-IoT system, thereby reducing a part of the transmission of reference signals in the NB-IoT system on the premise that the performance is generally kept stable.

FIG. 12 schematically illustrates a transmission method 1200 according to an embodiment of the present disclosure. The transmission method 1200 may be performed at a terminal device within a first system of a wireless communication system including the first system and a second system. As shown in FIG. 12, the transmission method 1200 according to the embodiment of the present disclosure includes step S1210 of obtaining an association between a first signal/channel in the first system and a second signal/channel in the second system; determining, according to the association and a predefined criterion, at least one of: a range of resources for a transmission of the first signal/channel included in the first system, or a range of resources for a transmission of the second signal/channel included in the second system; step S1220 of transmitting the first signal/channel only within the range of resources for the transmission of the first signal/channel; and step S1230 of monitoring the second signal/channel.

FIG. 12 also shows that the transmission method 1200 may further include step S1240 of deriving, based on the received second signal/channel in the second system, the first signal/channel that is not transmitted on other resources of all resources of the first system than the range of resources for the transmission of the first signal/channel, or using the received second signal/channel directly in the first system.

In an exemplary embodiment, the first signal/channel and the second signal/channel are downlink reference signals, and the using the received second signal/channel directly in the first system includes: using the received second signal/channel directly in downlink channel estimation of the first system.

In an exemplary embodiment, the range of resources may be a range of RBs or carriers containing REs on which the first signal/channel or the second signal/channel is mapped.

In an exemplary embodiment, the transmitting includes transmitting an uplink signal/channel and/or receiving a downlink signal/channel.

In an exemplary embodiment, the first signal/channel is a downlink reference signal, and the received second signal/channel may be used together with the first signal/channel for the downlink channel estimation of the first system.

In an exemplary embodiment, the monitoring the second signal/channel includes: monitoring the second signal/channel on all resources of the first system, or on other resources of all resources of the first system than the range of resources for the transmission of the first signal/channel.

In an exemplary embodiment, the association includes at least one of: positions of time-frequency resources used for the transmission of the first signal/channel, and positions of time-frequency resources used for the transmission of the second signal/channel, a mapping relationship between antenna ports of the first signal/channel and the second signal/channel, information about precoders of the first signal/channel and the second signal/channel, or a power offset between the first signal/channel and the second signal/channel.

In an exemplary embodiment, the positions of the time-frequency resource positions may be positions of REs on which the first signal/channel or the second signal/channel is mapped.

In an exemplary embodiment, the obtaining the association includes one of:

obtaining the association by a higher layer signaling and/or a physical layer signaling;

obtaining the association according to an explicit configuration; or obtaining the association according to a predefined implicit configuration.

FIG. 13 schematically illustrates a transmission method 1300 according to an embodiment of the present disclosure. The transmission method 1300 may be performed at a base station within a first system of a wireless communication system including the first system and a second system. As shown in FIG. 13, the transmission method 1300 according to the embodiment of the present disclosure includes step S1310 of notifying an association between a first signal/channel in the first system and a second signal/channel in the second system, at least one of the following may be determined according to the association and a predefined criterion: a range of resources for a transmission of the first signal/channel included in the first system, or a range of resources for a transmission of the second signal/channel included in the second system; and step S1320 of transmitting the first signal/channel only within the range of resources for the transmission of the first signal/channel.

FIG. 13 also shows that the transmission method 1300 may further include step S1330 of monitoring the second signal/channel; and step S1340 of deriving, based on the received second signal/channel in the second system, the first signal/channel that is not transmitted on other resources of all resources of the first system than the range of resources for the transmission of the first signal/channel, or using the received second signal/channel directly in the first system.

In an exemplary embodiment, the range of resources may be a range of RBs or carriers containing REs on which the first signal/channel or the second signal/channel is mapped.

In an exemplary embodiment, the positions of the time-frequency resource positions may be positions of REs on which the first signal/channel or the second signal/channel is mapped.

In an exemplary embodiment, the monitoring the second signal/channel includes: monitoring the second signal/channel on all resources of the first system, or on other resources of all resources of the first system than the range of resources for the transmission of the first signal/channel.

In an exemplary embodiment, the association includes at least one of: positions of time-frequency resources used for the transmission of the first signal/channel, and positions of time-frequency resources used for the transmission of the second signal/channel, a mapping relationship between antenna ports of the first signal/channel and the second signal/channel, information about precoders of the first signal/channel and the second signal/channel, or a power offset between the first signal/channel and the second signal/channel.

In an exemplary embodiment, the transmitting includes transmitting an uplink signal/channel and/or receiving a downlink signal/channel.

In an exemplary embodiment, the positions of the time-frequency resource positions may be positions of REs on which the first signal/channel or the second signal/channel is mapped.

In an exemplary embodiment, the notifying the association includes one of:

notifying the association by a higher layer signaling and/or a physical layer signaling;

notifying the association according to an explicit configuration; or notifying the association according to a predefined implicit configuration.

In an exemplary embodiment, the base station configures the association between the first signal/channel in the first system and the second signal/channel in the second system for the terminal of the first system and/or the second system. The terminal in the first system and/or the second system obtains the association, and determines the transmission positions of the first signal/channel in the first system and/or the transmission positions of the second signal/channel in the second system according to the association and the predefined criterion; and derives, based on one of the first signal/channel in the first system or the second signal/channel in the second system that is actually transmitted on the time-frequency resources where no specific signal is transmitted, related information of the other of the first signal/channel in the first system or the second signal/channel in the second system that is actually not transmitted on the time-frequency resources where no specific signal is transmitted, or directly uses the specific signal/channel that is actually transmitted for another system.

In an exemplary embodiment, the association includes at least one of: a mapping relationship between antenna ports of the first signal/channel in the first system and the second signal/channel in the second system, information about precoders of the first signal/channel in the first system and the second signal/channel in the second system, or a power offset between the first signal/channel in the first system and the second signal/channel in the second system.

In an exemplary embodiment, the association is configured in a higher layer signaling and/or a physical layer signaling, or is configured explicitly, or is configured according to a predefined implicit configuration. For example, the information about precoders and the mapping relationship between the antenna ports may be explicitly configured in a signaling; or the information about the precoders and the mapping relationship between the antenna ports are derived based on the C-RNTI value of the UE configured in the signaling, the DMRS antenna port index number and/or the subframe index number according to a predefined rule; or, there is a predefined mapping relationship between the antenna ports, and whether to enable the predefined mapping relationship is configured by the signaling. The higher layer signaling may be a UE-specific signaling, or a broadcast signaling (such as MIB, SIB, SI, CORESET, etc.), or a combination of the both (for example, some configuration information being carried in the UE-specific signaling, and some configuration information being carried in the broadcast signaling). The physical layer signaling may be a downlink control message DCI, an uplink control signaling UCI, and a signal/channel carrying HARQ-ACK feedback.

In an exemplary embodiment, the determining the transmission positions of the first signal/channel in the first system and/or the second signal/channel in the second system according to the association and the predefined criterion includes: determining whether the first/second signal/channel is transmitted in the entire bandwidth of the corresponding system according to whether the association is configured. For example, when the association is configured, the first/second signal/channel is transmitted in a predefined partial bandwidth of the corresponding system, and is not transmitted in the remaining bandwidth; otherwise, when the association is not configured, the first/second signal/channel is transmitted in the entire bandwidth of the corresponding system.

In a specific example, the first system is an NR system, and the second system is an LTE-MTC system. The base station configures the association between the CRS in the LTE-MTC and the DMRS in the NR for the NR and/or LTE-MTC terminal, and the LTE-MTC terminal obtains the association, determines the transmission position of the CRS according to the association and the predefined criterion, derives related information of CRS on the time-frequency resources on which no CRS is transmitted based on the DMRS in the NR, and performs channel estimation using the derived CRS. In another specific example, the LTE-MTC may not perform the step of deriving the CRS, but directly use the DMRS in the NR when performing the downlink channel estimation.

In an exemplary embodiment, the reference signal in the NR may be a CSI-RS, a PT-RS, a TRS, or an SRS in addition to the DMRS. In an exemplary embodiment, the association includes at least one of: a mapping relationship between antenna ports of NR reference signal and the LTE CRS, information about precoders of the NR reference signal and the LTE CRS, and a power offset between the NR reference signal and an LTE CRS signal/channel. In an exemplary embodiment, the LTE-MTC terminal obtains the configured association, transmits the CRS on the bandwidth when the LTE-MTC does not enable frequency hopping, and does not transmit the CRS on the bandwidth that may be occupied by the LTE-MTC after the frequency hopping is enabled. In another exemplary embodiment, the LTE-MTC terminal derives the transmission positions of the NR reference signal, and determines that the CRS will be transmitted within the LTE-MTC bandwidth on which there is no transmission of the NR reference signal; and the CRS will not be transmitted within the LTE-MTC bandwidth on which there is a transmission of the NR reference signal. In an exemplary embodiment, the LTE-MTC terminal monitors the reference signal of the NR system on a part of the MTC system bandwidth on which no CRS is transmitted, and determines related information of the CRS on the bandwidth according to the monitored NR reference signal and the association.

In a specific example, the first system is an NR system, and the second system is an NB-IoT system. The base station configures an association between the NRS in the NB-IoT and the specific reference signal in the NR for the NR and/or NB-IoT terminal. The NB-IoT terminal obtains the association, determines the transmission position of the NRS according to the association and the predefined criterion, and derives related information of the NRS on the time-frequency resources on which no NRS is transmitted based on the specific reference signal in the NR. The remaining content in this example is similar to the example where the second system is an MTC.

For a scenario where there are a first system and a second system in a wireless communication system, the frequency domain resources used by the first system and the second system at least partially overlap with each other, and there is a uplink or downlink signals are transmitted periodically in the second system, if the first system is NR, and the second system is LTE, and the periodically transmitted uplink or downlink signal is the CRS in the LTE system, the prior art supports the NR UE to perform rate matching around the LTE CRS. Specifically, the NR UE obtains the lte-CRS-ToMatchAround IE (Information Element) in the RRC signaling, determines the CRS configuration information in the LTE system according to the configuration information indicated in the lte-CRS-ToMatchAround, and determines whether to perform rate matching around the LTE CRS in the downlink transmission of the NR system according to the CRS configuration information in the LTE system.

The main drawback in the prior art is that the LTE CRS-based rate matching feature requires UE capability of the NR UE to support this. Accordingly, the UE may enable the LTE CRS-based rate matching feature, only after the UE reports the UE capability to the base station and/or receive the UE capability related configuration indicated by the base station. Conversely, for the NR UE in an IDLE and/or Inactive state, since the UE cannot report the UE capability to the base station and/or receive the UE capability related configuration indicated by the base station, the UE cannot enable the LTE CRS-based rate matching feature. Therefore, if there are overlapped frequency domain resources in the frequency domain resources used by the NR system and the LTE system, when the NR UE receives downlink signals/channels in the IDLE and/or inactive states (such as Msg2, Msg4, Msg B in the random access process, or other downlink signals/channels, downlink channels carrying paging signals) on the overlapped frequency domain resources, it will not assum that rate matching has been performed for NR downlink transmissions around the periodic downlink signals (such as CRS) in the LTE system. Instead, it performs the decoding in a manner that no periodic downlink signal in the LTE system exists in the NR system, that is, the actually received periodic downlink signal in the LTE system is decoded as a part of the NR downlink signals/channels. This behavior will seriously affect the performance of the UE for receiving the NR downlink transmission.

Therefore, an embodiment of the present disclosure further provide a method of allowing a UE in a first system to perform rate matching based on uplink or downlink signals that are transmitted periodically in a second system when the UE does not report the UE capability to a base station and/or receives UE capability related configuration indicated by the base station.

In an exemplary embodiment, for a scenario where there are a first system and a second system in a wireless communication system, the frequency domain resources used by the first system and the second system at least partially overlap with each other, and there is a uplink or downlink signals are transmitted periodically in the second system, the method includes, in the first system, obtaining information about overlapped frequency domain resources, and obtaining information about resource positions occupied by the uplink or downlink signal transmitted periodically in the second system; and avoiding performing an uplink transmission and/or avoiding monitoring a downlink transmission at the resource positions occupied by the uplink or downlink signal in the second system.

When the second system is at least one of LTE, LTE-MTC, and LTE-NB-IoT, the uplink or downlink signal transmitted periodically in the second system includes at least one of: PSS, SSS, PBCH, MIB, or SDB1, and downlink reference signal; and the downlink reference signal further includes at least one of CRS or NRS.

When the second system is an NR or any NR-related subsystem (for example, NR mMTC, NR eMBB, NR URLLC, NR V2X, NR-U, etc.), the uplink or downlink signal transmitted periodically in the second system includes at least one of: PSS, SSS, SSB, SS burst set, PBCH, a main system message MIB, SIB1, residual system information RMSI (Residual Minimum System Information), and downlink reference signals (such as DMRS, PT-RS, CSI-RS, SRS, etc.).

The obtaining the information about the resource positions occupied by the uplink or downlink signal that is transmitted periodically in the second system and avoiding performing the uplink transmission and/or avoiding monitoring the downlink transmission at the resource positions occupied by the uplink or downlink signal that is transmitted periodically in the second system includes: determining, according to the UE capability, whether to obtain the information about the resource positions occupied by the uplink or downlink signal that is transmitted periodically in the second system, and whether to avoid performing the uplink transmission and/or to avoid monitoring the downlink transmission at the resource positions occupied by the uplink or downlink signal in the second system.

Alternatively, the signaling in the first system includes at least one of the broadcast signaling in the first system, and the UE-specific signaling in the first system. Alternatively, the broadcast signaling in the first system further includes at least one of PBCH, MIB, SIB1, or RMSI.

Alternatively, the uplink transmission is a transmission of a specific uplink signal/channel, and/or the downlink transmission is a transmission of a specific downlink signal/channel.

Alternatively, the UE capability includes at least one of: whether the UE has a specific capability; whether the UE reports a specific UE capability to the base station; and whether the UE receives a configuration of a specific UE capability indicated by the base station.

Alternatively, the avoiding performing the uplink transmission and/or avoiding monitoring the downlink transmission at the resource positions occupied by the uplink or downlink signal in the second system includes at least one of:

performing rate matching for the uplink transmission in the first system around the resource positions occupied by the uplink or downlink signal in the second system;

assuming that rate matching had been performed for the downlink transmission in the first system around the resource positions occupied by the uplink or downlink signal in the second system;

performing rate matching for the uplink transmission in the first system according to the legacy method in which there is no uplink or downlink signal in the second system, and puncturing the uplink transmission in the first system at the resource positions occupied by the uplink or downlink signal in the second system;

assuming that rate matching had been performed for the downlink transmission in the first system according to the legacy method in which there is no uplink or downlink signal in the second system, and that the downlink transmission in the first system at the resource positions occupied by the uplink or downlink signal in the second system had been punctured.

Hereinafter, description will be made in conjunction with specific examples. In a specific example, the obtaining the information about the resource positions occupied by the uplink or downlink signal that is transmitted periodically in the second system and avoiding performing the uplink transmission or avoiding monitoring the downlink transmission at the resource positions occupied by the uplink or downlink signal in the second system includes:

the UE in the first system has the capability of supporting coexistence with the second system; if the UE in the first system has not yet reported the specific UE capability to the base station, and/or has not received the configuration of the specific UE capability indicated by the base station, the UE in the first system determining, according to the information indicated in the broadcast signaling in the first system, that:

when a specific uplink transmission is being performed, it performs rate matching for the uplink transmission in the first system according to the legacy method in which there is no uplink or downlink signal in the second system, and punctures the uplink transmission in the first system at the resource positions occupied by the uplink or downlink signal in the second system;

and/or, when a specific downlink transmission is being received, it assumes that that rate matching had been performed for the downlink transmission in the first system according to the legacy method in which there is no uplink or downlink signal in the second system, and assumed that the downlink transmission in the first system at the resource positions occupied by the uplink or downlink signal in the second system had been punctured.

Alternatively, the specific downlink transmission includes at least one of: a PDCCH (e.g., a PDCCH corresponding to an RAR, a PDCCH corresponding to paging) transmitted in an CSS; a PDSCH scheduled by the PDCCH transmitted in the CSS; all or a part of downlink transmissions in the random access process (for example, at least one of Msg2, Msg4, Msg B, and other downlink transmissions in the random access process); the PBCH; other downlink signals/channels transmitted in a broadcast way that may be received by the UE when the UE in the first system has not yet reported the specific UE capability to the base station and/or has not received the configuration of the specific UE capability indicated by the base station.

The obtaining the information about the resource positions occupied by the uplink or downlink signal that is transmitted periodically in the second system and avoiding performing the uplink transmission or avoiding monitoring the downlink transmission at the resource positions occupied by the uplink or downlink signal in the second system further includes:

the UE in the first system has the capability of supporting coexistence with the second system; if the UE in the first system has reported the specific UE capability to the base station, and/or has received the configuration of the specific UE capability indicated by the base station, the UE in the first system determining, according to the information indicated in the broadcast signaling in the first system and the information indicated in the UE-specific signaling, that:

when a specific uplink transmission is being performed, it performs rate matching for the uplink transmission in the first system according to the legacy method in which there is no uplink or downlink signal in the second system, and punctures the uplink transmission in the first system at the resource positions occupied by the uplink or downlink signal in the second system;

and/or, when a specific downlink transmission is being received, it assumes that rate matching had been performed for the downlink transmission in the first system according to the legacy method in which there is no uplink or downlink signal in the second system, and that the downlink transmission in the first system at the resource positions occupied by the uplink or downlink signal in the second system had been punctured.

Alternatively, the specific downlink transmission includes at least one of: a downlink signal/channel in a connected state in a contention-based random access process, other downlink signals/channels transmitted in a broadcast way that may be received by the UE after the UE in the first system has reported the specific UE capability to the base station and/or has received the configuration of the specific UE capability indicated by the base station (such as a PDCCH in the CSS, wherein the CSS may further include a CSS that may be monitoredd by the UE in the connected state and the UE in the IDLE/inactive state, such as Type-2 CSS corresponding to RAR).

This example is mainly used to explain how to maintain the system performance better for the downlink signal/channel that is transmitted by broadcast in the first system, when the receiving UE of the downlink signal/channel may include any combination of the following three types of UEs: a UE that does not have the ability to coexist with the second system (for ease of description, referred to as Class 1); a UE that has the ability to coexist with the second system but has not yet reported the UE capability and/or has not received the configuration of the specific UE capability indicated by the base station (for ease of description, referred to as Class 2); and a UE that has the ability to coexist with the second system and has reported the UE capability and/or has received the configuration of the specific UE capability indicated by the base station (for ease of description, Referred to as Class 3). In this scenario, since the base station processes the downlink transmission and/or uplink transmission in a punctured manner, the Class 2 and Class 3 UEs may normally handle the negative impacts of the periodic signals of the uplink and/or downlink transmission in the second system on the signals in the first system. Compared with the prior art, the Class 2 UE may correctly process the periodic signals of the uplink and/or downlink transmission in the second system even if the Class 2 UE does not report the UE capability or the Class 2 UE does not obtain the UE capability configuration; the Class 1 UE will assume that the transmission in the first system is not punctured because it does not have the corresponding UE capability; but no matter whether this scheme is adopted or not, since the periodic signal in the second system always needs to be transmitted and the Class 1 UE cannot process the periodic signals in the second system, the performance of the Class 1 UE will not be degraded compared with the prior art. The puncturing method is inferior in performance compared to the rate matching method in the examples described below to some extent, but its advantage is that it may be compatible with any combination of Class 1, Class 2, and Class 3 UEs, so it is more suitable for the broadcast downlink signals/channels.

In another specific example, the obtaining the information about the resource positions occupied by the uplink or downlink signal that is transmitted periodically in the second system and avoiding performing the uplink transmission or avoiding monitoring the downlink transmission at the resource positions occupied by the uplink or downlink signal in the second system includes:

the UE in the first system has the capability of supporting coexistence with the second system, and has reported the specific UE capability to the base station, and/or has received the configuration of the specific UE capability indicated by the base station, the UE in the first system determining, according to the information indicated in the broadcast signaling in the first system, that:

when the UE in the first system performs a specific uplink transmission, it performs rate matching for the uplink transmission in the first system around the resource positions occupied by the uplink or downlink signals in the second system;

and/or, when a specific downlink transmission is being received, it assumes that rate matching had been performed for the downlink transmission in the first system around the resource positions occupied by the uplink or downlink signals in the second system.

Alternatively, the specific downlink transmission includes at least one of: a PDCCH transmitted in a UE-specific search space; a PDSCH scheduled by a PDCCH that is transmitted in a UE-specific search space; and downlink signals/channels in a contention-free random access process (for example, at least one of Msg2, Msg4, and Msg B in the contention free random access); other downlink signals/channels transmitted in a unicast way that may be received by the UE after the UE in the first system reports the specific UE capability to the base station and/or receives the configuration of the specific UE capability indicated by the base station.

This example is mainly used to explain that for the downlink signal/channel transmitted by unicast in the first system, since the unicast traffic scenario does not need to consider how to be compatible with a plurality of types of UEs as in the broadcast traffic scenario, and the base station has obtained the information of whether the receiving UE of the downlink signal/channel has the specific UE capability, the base station may determine whether to perform rate matching around the periodic signals in the second system according to the UE capability accordingly. Compared with the punching method in the previous specific example, after determining whether the UE has the specific UE capability, using the rate matching method may further optimize the system performance, so it is more suitable for the unicast downlink signal/channel after the UE has reported the specific UE capability to the base station and/or has received the configuration of the specific UE capability indicated by the base station.

According to the embodiments of the present disclosure, for the method described above, the UE and/or the base station in the first and/or the second system may support all or a part of the methods at the same time, which may be specifically determined according to the configuration of the base station or according to the protocol. It is also possible to separately enable at least one of the methods for UEs with different capabilities (supporting all or a part of the above methods).

A structure of a radio node according to an exemplary embodiment of the present disclosure will be described below with reference to FIG. 14. FIG. 14 schematically illustrates a structural block diagram of a radio node 1400 according to an exemplary embodiment of the present disclosure. The radio node 1400 may be used to perform the method 300 described with reference to FIG. 3, the method 600 described with reference to FIG. 6, the method 700 described with reference to FIG. 7, the method 800 described with reference to FIG. 8, the method 900 described with reference to FIG. 9, and the method 1000 described with reference to FIG. 10, the method 1200 described with reference to FIG. 12, or the method 1300 described with reference to FIG. 13. For the sake of brevity, only the schematic structure of the radio node according to the exemplary embodiment of the present disclosure will be described herein, and details in the methods 300, 600, 700, 800, 900, 1000, 1200 and 1300 that have been described previously with reference to FIGS. 3, 6-10, and 11-12 will be omitted.

As shown in FIG. 14, the radio node 1400 includes a processing unit or a processor 1401, wherein the processor 1401 may be a single unit or a combination of multiple units for performing different steps of a method; and a memory 1402, which stores computer executable Instructions that, when executed by the processor 1401, cause the processor 1401 to: obtain information about overlapped frequency domain resources; determine the overlapped frequency domain resources, the determined overlapped frequency domain resources including frequency domain resources overlapping at a subcarrier level; and avoid performing an uplink transmission and/or avoid monitoring a downlink transmission on the determined overlapped frequency domain resources.

According to an embodiment of the present disclosure, the instructions, when executed by the processor 1401, further cause the processor 1401 to determine the overlapped frequency domain resources by at least one of: using predefined overlapped frequency domain resources; determining the overlapped frequency domain resources according to a first predetermined condition; and determining the overlapped frequency domain resources according to a configuration.

According to an embodiment of the present disclosure, the instructions, when executed by the processor 1401, further cause the processor 1401 to determine, according to received indication information, whether the first system and/or the second system is a predetermined communication system, and/or whether time domain and/or frequency domain resources used by the first system and/or the second system meet a second predetermined condition; and if so, to determine predefined frequency domain resources corresponding to the predetermined communication system and/or the second predetermined condition as the overlapped frequency domain resources.

According to an embodiment of the present disclosure, the instructions, when executed by the processor 1401, further cause the processor 1401 to determine the overlapped frequency domain resources according to a configuration indicated in a higher layer signaling and/or a physical layer signaling.

According to an embodiment of the present disclosure, the instructions, when executed by the processor 1401, further cause the processor 1401 to determine the overlapped frequency domain resources according to a bitmap in a received signaling, the bitmap including a subcarrier-level bitmap.

According to an embodiment of the present disclosure, the instructions, when executed by the processor 1401, further cause the processor 1401 to puncture the overlapped frequency domain resources or perform rate matching around the overlapped frequency domain resources, and/or process the overlapped frequency domain resources as reserved or unavailable resources, in order to avoid conflicts between the transmissions of the first system and the second system on the overlapped frequency domain resources.

According to an embodiment of the present disclosure, the instructions, when executed by the processor 1401, further cause the processor 1401 to shift frequency domain positions of RBs according to the determined overlapped frequency domain resources and/or a configuration of a frequency domain position of a starting subcarrier of the RBs, so that the frequency domain resources of the first system and the second system do not overlap any more.

According to an embodiment of the present disclosure, the instructions, when executed by the processor 1401, further cause the processor 1401 to determine, according to the configuration of the frequency domain position of the RB starting subcarrier, at least one of: the offset of the RB starting subcarrier, the shifting direction, the range of RBs of which the frequency domain position of the starting subcarrier is adjusted; shift the frequency domain position of the starting subcarrier of the range of RBs by the offset towards the shifting direction; and determine the shifted frequency domain position of the range of RBs according to the shifted position of the starting subcarrier. In an exemplary embodiment, the offset may be a positive value or a negative value, and the actual shifting direction may be determined in connection with the determined shifting direction.

According to an embodiment of the present disclosure, the adjusted RBs are all of the uplink and/or downlink RBs in the system bandwidth of the first system and/or the second system, or are specific uplink and/or downlink RBs in the system bandwidth determined according to at least one of: a predefined criterion, the determined overlapped frequency domain resources, or the configuration of the frequency domain position of the starting subcarrier of the RBs.

According to an embodiment of the present disclosure, the instructions, when executed by the processor 1401, further cause the processor 1401 to obtain configuration information, wherein the configuration information includes a specific signal/channel pattern, the pattern including at least a part of overlapped time-frequency resources; and the configuration information further includes information about the overlapped time-frequency resources, and/or indication information, wherein the indication information includes: information indicating not monitoring a downlink transmission of the specific signal/channel, and/or information indicating not transmitting an uplink transmission of the specific signal/channel; and according to the obtained configuration information, perform operations of: not monitoring the downlink transmission of the specific signal/channel, and/or not transmitting the uplink transmission of the specific signal/channel.

According to an embodiment of the present disclosure, the instructions, when executed by the processor 1401, further cause the processor 1401 to obtain information about overlapped frequency domain resources, and obtain information about resource positions occupied by the uplink or downlink signal transmitted periodically in the second system, the uplink or downlink signal transmitted periodically including at least SIB1 and/or NRS; and avoid performing an uplink transmission and/or avoid monitoring a downlink transmission at the resource positions occupied by the uplink or downlink signal in the second system.

According to an embodiment of the present disclosure, the instructions, when executed by the processor 1401, further cause the processor 1401 to cause the base station and/or terminal in the first system to puncture the resource positions occupied by the uplink or downlink signal in the second system or perform rate matching around the resource positions occupied by the uplink or downlink signal in the second system, and/or process the resource positions occupied by the uplink or downlink signal in the second system as reserved resources or unavailable resources.

According to an embodiment of the present disclosure, the instructions, when executed by the processor 1401, further cause the processor 1401 to obtain an association between a first signal/channel in the first system and a second signal/channel in the second system; determine, according to the association and a predefined criterion, at least one of: a range of resources for a transmission of the first signal/channel included in the first system, or a range of resources for a transmission of the second signal/channel included in the second system; transmit the first signal/channel only within the range of resources for the transmission of the first signal/channel; monitor the second signal/channel; and derive, based on the received second signal/channel in the second system, the first signal/channel that is not transmitted on other resources of all resources of the first system than the range of resources for the transmission of the first signal/channel, or use the received second signal/channel directly in the first system.

Various steps are described in a specific order in the above flowchart. However, it is obvious to the skilled in the art that those steps do not necessarily need to be performed in the order as shown, but may be performed in an opposite order or simultaneously in parallel as long as there is no contradiction.

The terms "first" and "second" are used herein to distinguish terms. However, the skilled in the art may recognize that this is only for the purpose of differentiation and not limitation. For example, the first system and the second system are interchangeable. That is, the method performed at the terminal/base station in the first system may also be performed at the terminal/base station in the second system.

In the prior art, in order for the base station to obtain better downlink channel quality, the UE reports CSI to the base station. The CSI report includes a periodic CSI report and an aperiodic CSI report. The periodic CSI report is performed according to the periodicity and time offset configured by the higher layer signaling. The aperiodic CSI report is driven by CSI request information in the DCI for the base station scheduling the PUSCH. The UE transmits the aperiodic CSI report to the base station of the serving cell as indicated by the CSI request information. The CSI as described here may include a CQI (Channel Quality Indicator), a PMI (Precoding Matrix Indicator), an RI (Rank Indicator), and the number of repetitions and/or aggregation level required by the UE for demodulating a hypothetical PDCCH etc.

In addition, generalized CSI also includes information that characterizes a semi-static/long-term state of a channel, such as RSRP (Reference Signal Received Power), RSRQ (Reference Signal Received Quality), RS-SINR (Reference Signal-Signal to Noise and Interference Ratio), and RSSI (Received Signal Strength Indicator) etc. Generally, such information is used for cell selection, cell handover, coverage level selection, and so on.

3GPP has standardized two sets of narrowband systems for IoT in Rel-13, i.e., eMTC (enhanced Machine Type Communication) and NB-IoT systems. For the UE in the IDLE state, the eMTC system supports a CSI feedback (also known as CSI report) in the Msg3 (Message 3) during the random access process; while the NB-IoT system supports a CSI report in the Msg3 during the random access process on the anchor carrier and the non-anchor carrier. For the UE in the connected state, in Coverage Mode A, the eMTC system supports periodic and aperiodic CSI reports, while the NB-IoT system does not support any CSI report. In addition, the eMTC and NB-IoT systems select a coverage level based on the RSRP.

In order to better allocate downlink resources to the IoT UE according to the channel state, how to report the channel state more effectively is a problem to be solved, particularly in the case where the uplink of the NB-IoT system only uses the NPUSCH channel to transmit uplink data and uplink control information. Therefore, the present disclosure provides a method of performing a CSI report in a connected state for an NB-IoT system.

In an exemplary embodiment, a UE in a connected state performs CSI measurement periodically, or triggers CSI measurement when a predetermined condition is met, or triggers CSI measurement after receiving a signaling indicating an aperiodic CSI report, the CSI measurement result being used for the periodic or aperiodic CSI report. The UE in the connected state performs the CSI report periodically, or triggers the CSI report when a predetermined condition is met, or triggers the CSI report after receiving the signaling indicating the aperiodic CSI report.

In a specific example, the UE in the connected state performs the CSI measurement periodically, and performs the CSI report periodically. The reported CSI is the CSI measured last time within a time range determined according to a predetermined condition. For example, the UE reports the CSI in Subframe n, and the reported CSI is the CSI measured last time in the range from Subframe n-M to Subframe n. The measurement time for periodically performing the CSI measurement and the reporting time for periodically performing the CSI report are independent or interrelated. For example, the UE performs the periodic CSI measurement from Subframe x1 to Subframe x2, and reports the measured periodic CSI in Subframe x1+Y or Subframe x2+Y.

In another specific example, the UE in the connected state periodically performs the CSI measurement, and triggers the CSI report when a first predetermined condition is met or after receiving a signaling indicating an aperiodic CSI report, the reported CSI being the CSI measured last time within a time range determined according to a second predetermined condition. For example, the UE periodically performs the CSI measurement, and triggers the CSI report when the RSRP is lower than a predetermined threshold or after receiving a signaling indicating an aperiodic CSI report. The time domain position of the reporting is Subframe n, and the CSI is the CSI measured last time in the range from Subframe n-M to Subframe n.

In another specific example, the UE in the connected state performs the CSI measurement when it meets a predetermined condition, and reports the measured CSI. The measurement time for periodically performing the CSI measurement and the reporting time for periodically performing the CSI report are independent or interrelated. For example, the UE performs the CSI measurement from Subframe x1 to Subframe x2, and reports the measured CSI in Subframe x1+Y or Subframe x2+Y.

In another specific example, the UE in the connected state performs the CSI measurement when a first predetermined condition is met, and performs the CSI report when a second predetermined condition is met, the reported CSI being the CSI measured last time within a time range determined according to the second predetermined condition, or the CSI corresponding to the first predetermined condition. For example, the UE triggers the CSI measurement when the RSRP is below a predetermined threshold, and when the variation of the measured CSI (referred to as the current CSI for convenience) relative to the CSI measured last time exceeds a threshold, reports the current CSI.

In another specific example, the UE in the connected state performs the CSI measurement when a first predetermined condition is met, and performs the CSI report after receiving a signaling indicating an aperiodic CSI report, the reported CSI being the CSI measured last time within a time range determined based on the second predetermined condition. For example, the UE triggers the CSI measurement when the RSRP is below a predetermined threshold, and triggers the CSI report after receiving the signaling indicating the aperiodic CSI report. The reported time domain position is Subframe n, and the reported CSI is the CSI measured last time within the range of Sub-frame n-M to Subframe n.

In another specific example, the UE in the connected state triggers the CSI measurement after receiving the signaling indicating the aperiodic CSI report, and reports the measured CSI after the measurement is completed.

In an exemplary embodiment, the UE in the connected state performs the CSI measurement and the CSI report, including reporting the CSI measured within the time range determined according to the predefined condition. Specifically, the time range determined according to the predefined conditions includes at least one of: a given time range before the time domain position for the CSI report, a given time range after the time domain position for the CSI report, a given time range before the time domain position at which the signaling indicating the aperiodic CSI report is received, or a given time range after the time domain position at which the signaling indicating the aperiodic CSI report is received.

For a given frequency domain resource, if more than one CSI measurement is performed within the time range determined according to the predetermined condition, the CSI obtained by the latest CSI measurement is reported, or the best CSI/the CSI preferred by the UE among a plurality of CSI obtained by a plurality of measurements is reported; otherwise, if no CSI measurement is performed within the time range determined according to the predetermined condition, or the time range determined according to the predetermined condition is shorter than the time length required for the CSI measurement, no CSI report is performed, or a predetermined CSI value is reported. The predetermined CSI value is used to indicate failure of the CSI measurement or the worst CSI.

In a specific example, the UE receives the signaling indicating the aperiodic CSI report in Subframe n0, and reports the CSI in Subframe n1, wherein the UE reports the CSI measured in a range from Subframe n0+X to Subframe n1-Y; where X and Y represent processing delays for the UE to decode the signaling and to generate a message carrying the CSI. The CSI measured in the range from Subframe n0+X to Subframe n1-Y may be the CSI corresponding to the CSI measurement triggered by the signaling indicating the aperiodic CSI report, or the CSI corresponding to the periodic CSI measurement, if the measurement time of the periodic CSI measurement is exactly within the range from Subframe n0+X to Subframe n1-Y.

In another specific example, the UE receives the signaling indicating the aperiodic CSI report in Subframe n0, and reports the CSI in Subframe n1, wherein the UE reports the CSI measured in a range from Subframes n1-X1 to Subframes n1-X2; where X1 indicates timeliness of the CSI measurement, that is, giving the earliest range of a valid CSI, and any CSI prior to this range being considered invalid; X2 indicates the processing delay for the UE to generate a message carrying the CSI.

In an exemplary embodiment, the UE in the connected state triggers the CSI measurement and/or the CSI report after receiving the signaling indicating the aperiodic CSI report, wherein the signaling for indicating the aperiodic CSI report includes at least one of: DCI, an MAC (Medium Access Control) signaling, or an RRC signaling. The DCI includes an uplink grant (UL grant) message and a downlink grant (DL grant) message. Using the MAC signaling to indicate the aperiodic CSI report includes: using an MAC CE (Control Element) to indicate the aperiodic CSI report and using an MAC header or a MAC subheader to indicate the aperiodic CSI report.

Reporting the CSI includes reporting the CSI using at least one of the following signalings/channels: PUSCH, PUCCH, MAC signaling, and RRC signaling. For the NB-IoT system, the PUSCH includes an NPUSCH format 1 and an NPUSCH format 2, and other NPUSCH formats supported by the system. Reporting the CSI using the MAC signaling includes reporting the CSI using the MAC CE and reporting the CSI using the MAC header or the MAC subheader.

In a specific example, the UE in the connected state triggers the CSI measurement and/or the CSI report after receiving the DCI indicating the aperiodic CSI report. If the DCI indicating the aperiodic CSI report is an uplink grant message, the CSI is reported using the PUSCH, including carrying the CSI in the PUSCH as a data message and carrying the CSI in the form of piggybacked UCI in the PUSCH; if the DCI indicating the aperiodic CSI report is a downlink grant message, the CSI is reported using the PUCCH, or the CSI is reported using a channel carrying HARQ-ACK feedback. For example, the CSI is reported using the NPUSCH format 2 in the NB-IoT system, specifically, including: carrying the CSI as a field contained in the feedback message in the NPUSCH format 2, and carrying the CSI in the form of piggybacked UCI in the NPUSCH format 2.

In another specific example, the UE in the connected state triggers the CSI measurement and/or the CSI report after receiving the MAC signaling indicating the aperiodic CSI report, and uses an MAC signaling to report the CSI. In another specific example, the UE in the connected state triggers the CSI measurement and/or the CSI report after receiving the RRC signaling indicating the aperiodic CSI report, and reports the CSI using an RRC signaling.

In an exemplary embodiment, the UE in the connected state performs the CSI measurement periodically, or triggers the CSI measurement when a predetermined condition is met, or triggers CSI measurement after receiving the signaling indicating the aperiodic CSI report; wherein the frequency domain resources for the CSI measurement include at least one of: frequency domain resources on which a given signal/channel is transmitted or monitored, downlink frequency domain resources in the FDD system that correspond to uplink frequency domain resources on which a given signal/channel is transmitted, uplink frequency domain resources in the FDD system that correspond to downlink frequency domain resources on which a given signal/channel is monitored, frequency domain resources for the periodic CSI report that are configured by the RRC signaling or the higher layer signaling or are preconfigured, frequency domain resources for the aperiodic CSI report that are configured by the RRC signaling or the higher layer signaling or are preconfigured, or frequency domain resources indicated in the signaling indicating the aperiodic CSI report. The frequency domain resources configured by the higher layer for the periodic CSI report or the aperiodic CSI report may be the anchor carrier and/or all the non-anchor carriers configured in the SIB. The frequency domain resources may be in a frequency domain resource unit such as a carrier wave, a narrow band, a broadband, or a PRB. The given signal/channel may be PDCCH, PDSCH, PUSCH, and the like, including the signaling indicating the aperiodic CSI report and the channel carrying the signaling indicating the aperiodic CSI report.

In an exemplary embodiment, the UE in the connected state reports the CSI periodically, or triggers the CSI report when a predetermined condition is met, or triggers the CSI report after receiving the signaling indicating the aperiodic CSI report; wherein, The reported CSI includes the CSI measured on at least one of: frequency domain resources on which a given signal/channel is transmitted or monitored, downlink frequency domain resources in the FDD system that correspond to uplink frequency domain resources on which a given signal/channel is transmitted, uplink frequency domain resources in the FDD system that correspond to downlink frequency domain resources on which a given signal/channel is monitored, frequency domain resources for the periodic CSI report that are configured by the RRC signaling or the higher layer signaling or are preconfigured, frequency domain resources for the aperiodic CSI report that are configured by the RRC signaling or the higher layer signaling or are preconfigured, or frequency domain resources indicated in the signaling indicating the aperiodic CSI report. The frequency domain resources configured by the higher layer for the periodic CSI report or the aperiodic CSI report may be the anchor carrier and/or all the non-anchor carriers configured in the SIB. The frequency domain resources may be in a frequency domain resource unit such as a carrier wave, a narrow band, a broadband, or a PRB. The given signal/channel may be PDCCH, PDSCH, PUSCH, and the like, including the signaling indicating the aperiodic CSI report and the channel carrying the signaling indicating the aperiodic CSI report.

In an exemplary embodiment, the frequency domain resources for the UE in the connected state to measure the CSI are the same as the frequency domain resources corresponding to the CSI report, that is, the UE reports all the CSI measurement results. In another exemplary embodiment, the frequency domain resources for the UE in the connected state to measure the CSI are different from the frequency domain resources corresponding to the CSI report. For example, the content of the CSI report is a subset of the CSI measurement results. Specifically, the content of the CSI report is the CSI measurement result corresponding to a subset of all the frequency domain resources for measuring the CSI.

In a specific example, the UE in the connected state performs the CSI measurement periodically on a plurality of non-anchor carriers, and triggers the CSI report when the first predetermined condition is met or after the signaling indicating the aperiodic CSI report is received. The reported CSI is the CSI measured last time on the plurality of non-anchor carriers within the time range determined according to the second predetermined condition.

In an exemplary embodiment, the UE in the connected state performs the CSI measurement periodically. Specifically, the UE measures the CSI within a given time window in each CSI measurement period.

The CSI measurement period is predefined or configured at the high layer, including at least one of an integer multiple of a PDCCH period, or a measurement period dedicated to the CSI measurement. The PDCCH includes a USS (UE-specific Search Space) and a CSS; the PDCCH may be one or several specific types of PDCCHs, for example, the PDCCHs corresponding to the USS and/or paging.

When the UE performs the CSI measurement on the plurality of frequency domain resources, the CSI measurement periods corresponding to different frequency domain resources and/or the configurations of given time windows within the measurement periods are the same, or are determined for each frequency domain resource respectively.

In a specific example, the CSI measurement period is an integer multiple of the PDCCH. Specifically, the PDCCH period T=Rmax*G, and the CSI measurement period is N*Rmax*G, where N is a positive integer.

In another specific example, the CSI measurement period is an integer multiple of the PDCCH corresponding to the paging. A feasible scenario is that on the NB-IoT non-anchor carrier, it is introduced that an NRS is still transmitted even if there is no NPDCCH transmission in Release 16. For example, according to a given PO (Paging Occasion) pattern, even if there is no NPDCCH transmission on a PO set, there is a subframe in the PO set in which there is an NRS transmission. One possible design for the PO pattern is that for every N POs (which may be the UE's own POs, or the UE's own POs and other UE's POs), even if there is no NPDCCH transmission in the N-th PO, there a subframe in the N-th PO in which there is an NRS transmission. Accordingly, the NRS that is still transmitted even if there is no NPDCCH transmission may be used for the CSI measurement. Thus, the measurement period of the UE is also configured to be N times of the PDCCH period of the paging, so that the UE may perform the CSI measurement in each PO that definitely contains the NRS according to the PO pattern. This example only shows an implementation of determining the CSI measurement period based on the PO pattern for a specific PO pattern. The method in this implementation may also be similarly applied to other different PO patterns. The PO pattern may include the UE's own POs and other UE's POs, or may only include the UE's own POs. Therefore, the measurement period of the UE may be N times of the PDCCH period of its own paging, or N times of the PDCCH period of the paging from the network's perspective. The latter may be embodied to be an NRS detection period configured by the higher layer corresponding to the NRS features introduced in Release 16, and the NRS detection period is also considered as the CSI measurement period.

In an exemplary embodiment, the given time window is a specific set of time domain resources within the CSI measurement period. In a specific example, the position of the given time window may be derived based on a length of the given time window, a starting subframe of the given time window, and an offset of the starting subframe of the CSI measurement period. In another exemplary embodiment, the given time window may be the entire CSI measurement period, that is, the CSI measurement may be performed on any subframe within the CSI measurement period.

In another exemplary embodiment, the time for performing CSI measurement in a given time window is all time domain resources in the given time window, or a subset of all time domain resources in the given time window.

In an exemplary embodiment, when the UE in the connected state performs the CSI measurement in the NB-IoT system (including performing the CSI measurement periodically, or triggering the CSI measurement when the predetermined condition is met, or triggering the CSI measurement after receiving the signaling indicating the aperiodic CSI report), the reference signal for the CSI measurement includes the NRS.

In an exemplary embodiment, the NRS for the CSI measurement on the NB-IoT non-anchor carrier includes at least one of:
an NRS transmitted on a fixed subframe;
an NRS transmitted on a subframe containing the NRS indicated by the bitmap in the SIB1-NB;
a newly introduced NRS dedicated to the CSI measurement; or
an NRS corresponding to an NPDCCH or NPDCCH candidate or an NPDSCH or a WUS (Wake-Up Signal) (also called NWUS (NB-IoT WUS) in the NB-IoT).

The NRS corresponding to the NPDCCH or NPDCCH candidate or the NPDSCH or the WUS (also called NWUS in the NB-IoT) includes: an NRS transmitted on all subframes of at least one of, and/or on some subframes of at least one of, and/or on M subframes before at least one of, and/or on N subframes after at least one of: an NPDCCH, an NPDCCH candidate, an NPDSCH, where M and N are non-negative integers.

In a specific example, the NRS for the CSI measurement on the NB-IoT non-anchor carrier includes an NRS transmitted on all subframes of at least one of, and/or on some subframes of at least one of, and/or on M subframes before at least one of, and/or on N subframes after at least one of: an NPDCCH candidate corresponding to the paging DCI, Type-2 CSS, Type 1A and Type 2A NPDCCHs for random access, NPDSCH for transmitting the Msg4 in the random access process, an NPDSCH scheduled by the DCI that is scrambled by G-RNTI or SC-RNTI, or NWUS. It also includes Subframes 0/1/3/4/9 in the FDD system, Subframes 0/Subframe 5 in the TDD system, and a subframe in the SIB1-NB that contains the NRS indicated by the bitmap.

In an exemplary embodiment, the UE in the connected state performs the CSI measurement in the NB-IoT system (including performing the CSI measurement periodically, or triggering the CSI measurement when the predetermined condition is met, or triggering the CSI measurement after receiving the signaling indicating the aperiodic CSI report), the time domain positions (also referred to as the time domain positions of the CSI reference resources) for performing the CSI measurement are determined based on the position of the NRS and/or the type of the NRS. In an exemplary embodiment, the time-domain positions where the CSI measurement is performed are a subset of the subframes including the NRS.

In a specific example, the UE uses the NRS corresponding to the NPDCCH for the CSI measurement. The UE starts the CSI measurement at the starting subframe of the NPDCCH, or at the start position of the subframe before the NPDCCH in which the NRS is transmitted, and ends the CSI measurement after a fixed length of time domain resources are measured, or at the ending subframe of the NPDCCH, or at the end position of the subframe after the NPDCCH in which an NRS is transmitted. Therefore, the starting position of the CSI measurement (also referred to as the starting position of the CSI reference resources) includes at least one of: a starting subframe of the NPDCCH, a starting position of the subframe including the NRS before the NPDCCH, or an earliest subframe that includes the NRS after a fixed gap from the subframe occupied by the signaling indicating the aperiodic CSI report. The end position of the CSI measurement (also referred to as the end position of the CSI reference resources) includes at least one of: an ending subframe of the NPDCCH, an ending position of the subframe that includes the NRS after the NPDCCH, or an NCSI-th subframe (or an (NCSI-1)-th subframe) after the starting subframe of the CSI measurement after a fixed gap from the subframe occupied by the signaling indicating the aperiodic CSI report, wherein NCSI is the time domain length of the CSI measurement (also referred to as the time domain length of the CSI reference resources), which may be a fixed value or calculated based on other parameters. Further, when the starting position or ending position of the CSI measurement includes multiple items, one of the items is selected according to a predefined priority, or the earliest or latest starting position or ending position is used.

In the above specific example, the NPDCCH may also be replaced with the NPDCCH candidate. In this example, since the NRS corresponding to the NPDSCH or WUS is also similarly transmitted on the subframe for transmitting the NPDSCH or WUS, on the M subframe previous to the subframe for transmitting the NPDSCH or WUS and on the N subframes next to the subframe for transmitting the NPDSCH or WUS, the NPDCCH may be similarly replaced with the NPDSCH or WUS. The WUS may be a WUS corresponding to the paging NPDCCH. Since both the anchor carrier and the non-anchor carrier in the NB-IoT system have NRS transmissions corresponding to the NPDCCH, NPDCCH candidate, NPDSCH, and WUS, the above specific examples are applicable to anchor carrier and non-anchor carrier. When the specific configurations (for example, the positions of the subframes with the NRS transmission) of the anchor carrier and the non-anchor carrier corresponding to the NRS of the NPDCCH are different, the time domain positions of the CSI measurement are determined based on the corresponding configuration, respectively. In the above specific example, the subframe occupied by the signaling indicating the aperiodic CSI report may also be replaced with the subframe for successfully decoding the signaling indicating the aperiodic CSI report.

In a specific example, the NRS is transmitted on 10 subframes before the starting subframe of the NPDCCH and is transmitted on all subframes in the NPDCCH, and is transmitted on 4 subframes after the ending subframe of the NPDCCH. The starting subframe of the NPDCCH is k0, and the ending subframe is k0+T. Therefore, the start position of the reference resource for the CSI measurement is Subframe k0−10, and the end position of the reference position for the CSI measurement is Subframe k0+T+4.

In a specific example, the UE uses the NRS corresponding to the NPDCCH for the CSI measurement. Specifically, the UE starts the CSI measurement from the earliest subframe including the NRS after a fixed gap from the subframe occupied by the DCI indicating the aperiodic CSI report, and ends the CSI measurement after a fixed gap from the subframe occupied by the DCI indicating the aperiodic CSI report. For example, the UE receives the DCI indicating the aperiodic CSI report in Subframe n, starts the CSI measurement in Subframe n+X1, and ends the CSI measurement in Subframe n+X2, where X1 and X2 are non-negative integers, and are used for indicating the lengths of the fixed gaps.

In a specific example, the UE uses a newly introduced NRS dedicated to the CSI measurement for the CSI measurement. The UE obtains the configuration of the newly introduced NRS dedicated to the CSI measurement, including at least one of: a period of the newly introduced NRS dedicated to the CSI measurement, an offset of the newly introduced NRS dedicated to the CSI measurement (referring to an offset between the starting subframe of the newly introduced NRS dedicated to the CSI measurement and the starting subframe of each period), and a length of a duration of the newly introduced NRS dedicated to the CSI measurement. According to the configuration of the newly introduced NRS dedicated to the CSI measurement, the UE performs the CSI measurement on the subframe on which the newly introduced NRS dedicated to the CSI measurement is transmitted, or on a subset of subframes of the newly introduced NRS dedicated to the CSI measurement. Another possible way is that the UE obtains the configuration information of the CSI measurement, including the time domain position at which the CSI measurement is performed, and the UE assumes that there is always a transmission of the newly introduced NRS dedicated to the CSI measurement at the time domain position.

In a specific example, the UE uses the NRS transmitted on the fixed subframe for the CSI measurement. There are NRS transmissions on all the subframes on the anchor carrier in the NB-IoT system. The UE selects the time domain resources for the CSI measurement according to the period and/or time window of the CSI measurement configuration. On the non-anchor carrier in the NB-IoT system, taking the FDD system as an example, there are NRS transmissions on Subframe 0/1/3/4/9, and the UE selects the range of time domain resources for the CSI measurement according to the period and/or time window of the CSI measurement configuration, and performs the CSI measurement on Subframes 0/1/3/4/9 within the range. Similarly, the UE may use the same method to perform the CSI measurement using the subframe containing NRS indicated by the bitmap in the SIB1-NB, select the range of time domain resources for the CSI measurement according to the period and/or time window of the CSI measurement configuration, and perform the CSI measurement on the subframes within the range that have the NRS.

In a specific example, the UE uses any type of NRS for the CSI measurement. The any type of NRS includes the NRS transmitted on the fixed subframe, the NRS transmitted on the subframe containing the NRS indicated by the bitmap in the SIB1-NB, the newly introduced NRS dedicated to the CSI measurement, the NRS corresponding to the NPDCCH/NPDCCH candidate/NPDSCH/WUS. According to the configuration information of the CSI measurement, the UE selects the range of time domain resources for the periodic CSI measurement or the range of time domain resources for the triggered CSI measurement, and performs the CSI measurement on all or a part of the subframes within the range that have any type of the NRSs. The part of the subframes may be the earliest NCSI subframes or the last NCSI subframes of all the subframes within the range that have any type of the NRSs, or NCSI ones of all the subframes determined by a predefined mapping, or any NCSI subframes.

In an exemplary embodiment, when the UE in the connected state performs the CSI measurement, the length NCSI of the time domain resources for the CSI measurement is a fixed value, which is predefined or configured by the higher layer. In an exemplary embodiment, when the UE in the connected state performs the CSI measurement, the length NCSI of the time domain resources for the CSI measurement is calculated according to the predefined value or the value configured by the higher layer and according to at least one of the following parameters: the maximum number of repetitions Rmax in the PDCCH configuration, the number of PUSCH repetitions, the number of PDSCH repetitions, the number of DCI repetitions indicated in the DCI, the number of repetitions used for actual demodulation of the DCI, and the downlink quality. The downlink quality may be the number of repetitions and/or the aggregation level required for the UE to demodulate the hypothetical PDCCH, and may further be the downlink quality reported by the UE in the Msg 3 of the random access process.

The predefined value or the value configured by the higher layer are corresponding to different types of NRSs, different CE (Coverage Enhancement) levels, or CE modes that are configured respectively, or the same.

When the CSI measurement and/or the CSI report is triggered by the DCI, the maximum number of repetitions Rmax in the PDCCH configuration is the Rmax of the PDCCH that receives the CSI for triggering the CSI measurement and/or the CSI report, the number of PUSCH/PDSCH repetitions is the number of PUSCH/PDSCH repetitions scheduled in the DCI for triggering the CSI measurement and/or the CSI report, the number of DCI repetitions indicated in the DCI is the number of DCI repetitions indicated in the DCI for triggering the CSI measurement and/or the CSI report, and the number of repetitions used for actual demodulation of the DCI is the number of repetitions for demodulating the DCI for triggering the CSI measurement and/or the CSI report.

In a specific example, the UE calculates NCSI=NCSI0*Y according to the CSI measurement duration NCSI0 that is predefined or configured by the higher layer, where Y is at least one of: the maximum number of repetitions Rmax in the PDCCH configuration, the number of PUSCH repetitions, the number of PDSCH repetitions, the number of DCI repetitions indicated in the DCI, the number of repetitions used for actual demodulation of the DCI, or the downlink quality.

In an exemplary embodiment, the UE in the connected state triggers the CSI measurement when the first predetermined condition is met, and/or triggers the CSI report when the second predetermined condition is met, wherein the first predetermined condition and/or the second predetermined condition include at least one of:
  receiving the signaling indicating the aperiodic CSI report;
  the RSRP being lower or higher than a predetermined threshold;
  the variation of the RSRP exceeding a predetermined threshold;
  the CE level or CE mode being lower or higher than a predetermined threshold;
  the variation of the CE level or CE mode exceeding a predetermined threshold;
  the measured CSI being higher or lower than a predetermined threshold;
  the variation of the measured CSI exceeding a predetermined threshold
  the specific number of repetitions being lower or higher than a predetermined threshold;
  the variation of the specific number of repetitions exceeding a predetermined threshold.

The specific number of repetitions includes at least one of: the maximum number of repetitions Rmax in the PDCCH configuration, the number of PUSCH repetitions, the number of PDSCH repetitions, the number of DCI repetitions indicated in the DCI, the number of repetitions used for actual demodulation of the DCI, and the downlink quality. The downlink quality may be the number of repetitions and/or the aggregation level required for the UE to demodulate the hypothetical PDCCH, and may further be the downlink quality reported by the UE in the Msg 3 of the random access process.

The predetermined thresholds corresponding to each of the above items are predefined or configured by the higher layer, including values calculated based on predefined values or values configured by the higher layer and other parameters. The predetermined thresholds corresponding to each of the above items may be different from each other and/or configured independently.

Being lower or higher than the predetermined threshold and/or of the variation exceeding the predetermined threshold includes: being lower or higher than the predetermined threshold and/or the variation exceeding the predetermined threshold on consecutive N subframes, and further includes: being lower or higher than the predetermined threshold and/or the variation exceeding the predetermined threshold on N consecutive CSI measurements or N consecutive subframes for CSI measurement.

In the scenario where the DCI triggers the CSI measurement and the CSI report, sufficient time is required to complete the CSI measurement before the CSI report is transmitted. However, the gap between the DCI used in the existing system and the corresponding data may not be long enough to complete the CSI measurement. Therefore, it is also necessary to determine whether to perform the CSI measurement and/or the CSI report based on the length of the gap between the DCI and the corresponding data that is indicated in the DCI, or to newly introduce a gap length that is long enough.

In an exemplary embodiment, the UE in the connected state triggering the CSI measurement and/or the CSI report after receiving the DCI indicating the aperiodic CSI report further includes: determining whether to perform the CSI report and/or determine the time domain resource position of the CSI report according to the information indicated in the DCI.

In an exemplary embodiment, the DCI indicating the aperiodic CSI report explicitly indicates whether to trigger the CSI measurement and/or the CSI report by a specific field. In another exemplary embodiment, the DCI indicating the aperiodic CSI report implicitly indicates whether to trigger the CSI measurement and/or the CSI report by implicitly indicating whether to trigger the CSI measurement and/or the CSI report according to whether values of some fields in the DCI meet a predetermined condition.

In a specific example, the UE in the connected state receives the DCI indicating the aperiodic CSI report, the DCI carrying 1 bit for indicating whether to trigger the CSI measurement and/or the CSI report. In another specific example, the UE in the connected state receives the DCI indicating the aperiodic CSI report. When the value of the scheduling delay field in the DCI is greater than and/or equal to a given threshold, it implicitly indicates that the CSI measurement and/or the CSI report is triggered; otherwise, it implicitly indicates that the CSI measurement and/or CSI report is not triggered.

In an exemplary embodiment, the UE in the connected state receives the DCI indicating the aperiodic CSI report, and the DCI indicates triggering the CSI measurement and/or the CSI report; if the gap indicated in the DCI between the time domain resource position of the CSI report and the time domain resource position at which the DCI is received is greater than and/or equal to a given threshold, the UE in the connected state triggers the CSI measurement and/or the CSI report, otherwise the UE in the connected state does not trigger the CSI measurement and/or the CSI report.

The given threshold may be a predefined value or a fixed value configured by the higher layer, or may be calculated according to the predefined value or the value configured by the higher layer, and according to at least one of the following parameters: the maximum number of repetitions Rmax in the PDCCH configuration, the number of PUSCH repetitions, the number of PDSCH repetitions, the number of DCI repetitions indicated in the DCI, the number of repetitions used for the actual demodulation of the DCI, and the downlink quality. The downlink quality may be the number of repetitions and/or the aggregation level required for the UE to demodulate the hypothetical PDCCH, and may further be the downlink quality reported by the UE in the Msg 3 of the random access process.

In a specific example, after the UE in the connected state receives the DCI for indicating the aperiodic CSI report, if the scheduling delay indicated in the DCI is less than Dthreshold*N*Rmax, the UE in the connected state does not trigger the CSI measurement and/or the CSI report; otherwise, if the scheduling delay indicated in DCI is greater than or equal to Dthreshold*N*Rmax, the UE in the connected state triggers the CSI measurement and/or the CSI report, wherein Dthreshold is a predefined value or a value configured by the higher layer, where N is a positive number.

In an exemplary embodiment, after receiving the DCI indicating the aperiodic CSI report, the UE in the connected state assumes that the gap indicated in the DCI between the time domain resource position reported by the CSI and the time domain resource position at which the DCI is received uses a new set of values corresponding to the CSI report; otherwise, after receiving other DCIs that do not indicate the aperiodic CSI report, the UE assumes that the gap indicated in the DCI between the time domain resource position reported by the CSI and the time domain resource position at which the DCI is received uses a set of values in the existing system.

In a specific example, the UE in the connected state receives the DCI indicating the aperiodic CSI report. If the DCI implicitly or explicitly indicates that the CSI measurement and/or the CSI report is not triggered, the scheduling delay indicated in the DCI uses a set of values in the prior art. Specifically, in the prior art, two tables are respectively used for the FDD system and the TDD system. For the four states {0,1,2,3} of the scheduling delays, the two tables correspond to two sets of scheduling delay values {8,16,32,64} and {0,8,16,32} respectively. Otherwise, if the DCI implicitly or explicitly indicates that the CSI measurement and/or the CSI report is triggered, the scheduling delay indicated in the DCI uses a new set of values corresponding to the CSI report. For example, two new tables are used for the FDD system and the TDD system respectively, wherein the four states {0,1,2,3} of the scheduling delay correspond to two sets of scheduling delay values {X1, X2, X3, X4} and {Y1, Y2, Y3, Y4} one by one respectively. The values in the two tables may be fixed or derived from other parameters including at least one of: the maximum number of PDCCH repetitions Rmax, the number of DCI repetitions indicated in DCI, the maximum number of PUSCH repetitions, and the number of PDSCH repetitions. For example, when the other parameter is the maximum number of PDCCH repetitions Rmax, the two tables are {X1*Rmax, X2*Rmax, X3*Rmax, X4*Rmax}, and {Y1*Rmax, Y2*Rmax, Y3*Rmax, Y4*Rmax}, respectively.

A program for realizing the functions of the embodiments of the present invention may be recorded on a computer readable recording medium. The corresponding functions may be realized by causing a computer system to read programs recorded on the recording medium and execute the programs. The phrase "computer system" used herein may be a computer system embedded in the device, and may include an operating system or hardware (such as a peripheral device). The "computer readable recording medium" may be a semiconductor recording medium, an optical recording medium, a magnetic recording medium, a recording medium of a short-term dynamic storage program, or any other recording medium readable by a computer.

The various features or functional blocks used in the device in the above embodiments may be implemented or executed by circuitry (e.g., monolithic or multi-chip integrated circuits). Circuitry designed to perform the functions described in this specification may include general purpose processors, digital signal processors (DSPs), application specific integrated circuits (ASICs), field programmable gate arrays (FPGAs), or other programmable logic devices, discrete gates or transistor logic, discrete hardware components, or any combination of the above. A general purpose processor may be a microprocessor or any existing processor, controller, microcontroller, or state machine. The above circuit may be a digital circuit or an analog circuit. One or more embodiments of the present invention may also be implemented using new integrated circuit technologies in the context of the new integrated circuit technologies that replace existing integrated circuits due to advances in semiconductor technology.

As will be appreciated by the skilled in the art, the present disclosure includes devices related to performing one or more of the operations described in the present disclosure. These devices may be specially designed and manufactured for the required purpose, or they may include known devices in general-purpose computers. These devices have computer programs stored therein that are selectively activated or reconstructed. Such a computer program may be stored in a device (e.g., a computer) readable medium or in any type of medium suitable for storing electronic instructions and respectively coupled to a bus, including but not limited to, any types of disks (including floppy disks, hard disks, CD-ROMs, CD-ROMs, and magneto-optical disks), ROM (Read-Only Memory), RAM (Random Access Memory), EPROM (EraSable Programmable Read-Only Memory), Erasable Programmable Read-Only Memory), EEPROM (Electrically EraSable Programmable Read-Only Memory), flash memory, magnetic card or optical card. That is, a readable medium includes any medium that stores or transfers information in a readable form by a device (e.g., a computer).

The skilled in the art may understand that computer program instructions may be used to implement each block in these structural diagrams and/or block diagrams and/or flow diagrams and a combination of these structural diagrams and/or block diagrams and/or flow diagrams. The skilled in the art may understand that these computer program instructions may be provided to a processor of a general-purpose computer, a professional computer, or other programmable data processing methods, so that the present invention is executed by a processor of a computer or other programmable data processing method. Disclose the scheme specified in the box or boxes of the structural diagram and/or block diagram and/or flow diagram.

The skilled in the art may understand that the various operations, methods, steps, measures, and solutions in the process that have been discussed in this disclosure may be alternated, changed, combined, or deleted. Further, various operations, methods, and other steps, measures, and solutions in the process that have been discussed in this disclosure may also be alternated, modified, rearranged, decomposed, combined, or deleted. Further, steps, measures, and solutions in the prior art that have various operations, methods, and processes disclosed in this disclosure may also be alternated, modified, rearranged, decomposed, combined, or deleted.

The above description is only a part of the embodiments of the present disclosure. It should be noted that for the skilled in the art, various improvements and refinements may be made without departing from the principles of the present disclosure. These improvements and refinements should also be regarded as falling within the protection scope of the present disclosure.

According to an exemplary embodiment of the present disclosure, the determining the overlapped frequency domain resources includes one or any combination of:

using predefined overlapped frequency domain resources;

determining the overlapped frequency domain resources according to a first predetermined condition; and determining the overlapped frequency domain resources according to a configuration.

According to an exemplary embodiment of the present disclosure, the determining the overlapped frequency domain resources according to the first predetermined condition includes:

determining, according to received indication information, whether the first system and/or the second system is a predetermined communication system, and/or whether time domain and/or frequency domain resources used by the first system and/or the second system meet a second predetermined condition; and if so, determining predefined frequency domain resources corresponding to the predetermined communication system and/or the second predetermined condition as the overlapped frequency domain resources.

According to an exemplary embodiment of the present disclosure, the predetermined communication system may be an LTE-MTC system.

According to an exemplary embodiment of the present disclosure, the determining the overlapped frequency domain resources according to the configuration includes: determining the overlapped frequency domain resources according to the configuration indicated in a higher layer signaling and/or a physical layer signaling.

According to an exemplary embodiment of the present disclosure, the determining the overlapped frequency domain resources according to the configuration includes: determining the overlapped frequency domain resources according to a bitmap in a received signaling, the bitmap including a subcarrier-level bitmap.

According to an exemplary embodiment of the present disclosure, the avoiding performing the uplink transmission and/or avoiding monitoring the downlink transmission on the determined overlapped frequency domain resources includes one of:

puncturing the overlapped frequency domain resources or performing rate matching around the overlapped frequency domain resources, and/or processing the overlapped frequency domain resources as reserved or unavailable resources;

shifting frequency domain positions of RBs (Resource Blocks) according to the determined overlapped frequency domain resources and/or a configuration of a frequency domain position of a starting subcarrier of the RBs, so that the frequency domain resources of the first system and the second system do not overlap any more.

According to an exemplary embodiment of the present disclosure, the configuration of the frequency domain position of the starting subcarrier of the RBs includes at least one of information on whether to enable a feature of adjusting the frequency domain position of the starting subcarrier, an offset of the frequency domain position of the starting subcarrier, a shifting direction of the starting subcarrier, a range of RBs of which the frequency domain position of the starting subcarrier is adjusted, a type of the first system and/or the second system, positions of the frequency domain resources of the first system and/or the second system, a position of a center frequency point or a DC (Direct Current) subcarrier of the first system and/or the second system, or whether all or specific frequency domain resources of the first system and/or the second system include the DC subcarrier.

According to an exemplary embodiment of the present disclosure, the range of RBs of which the frequency domain position of the starting subcarrier is adjusted is all uplink and/or downlink RBs in a system bandwidth of the first system, or specific uplink and/or downlink RBs in the system bandwidth determined according to at least one of: a predefined criterion, the determined overlapped frequency domain resources, or the determined configuration of the frequency domain position of the starting subcarrier of the RBs.

According to an exemplary embodiment of the present disclosure, the shifting the frequency domain positions of the RBs according to the determined overlapped frequency domain resources and/or the configuration of the frequency domain position of the starting subcarrier of the RBs includes:

determining, according to the determined overlapped frequency domain resources and/or the configuration of the frequency domain position of the starting subcarrier of the RBs, at least one of: an offset of the starting subcarrier of the RBs, a shifting direction of the starting subcarrier, or a range of RBs of which the frequency domain position of the starting subcarrier is adjusted; and shifting the frequency domain position of the starting subcarrier of the range of RBs by the offset towards the shifting direction, and determining the shifted frequency domain position of the range of RBs according to the shifted position of the starting subcarrier.

According to an exemplary embodiment of the present disclosure, the first system is one of an LTE-MTC system and an NR system, and the second system is the other of the LTE-MTC system and the NR system.

According to an exemplary embodiment of the present disclosure, the specific signal/channel is a specific class of signals/channels or a specific subset of the specific class of signals/channels.

According to an exemplary embodiment of the present disclosure, the obtaining the configuration information includes:

obtaining the configuration information according to a configuration indicated in a higher layer signaling and/or a physical layer signaling.

According to an exemplary embodiment of the present disclosure, the specific signal/channel is a PT-RS (Phase Tracking-Reference Signal).

According to an exemplary embodiment of the present disclosure, the avoiding the uplink transmission and/or avoiding monitoring the downlink transmission at the resource positions occupied by the uplink or downlink signal in the second system includes:

puncturing the resource positions occupied by the uplink or downlink signal in the second system or performing rate matching around the resource positions occupied by the uplink or downlink signal in the second system, and/or processing the resource positions occupied by the uplink or downlink signal in the second system as reserved resources or unavailable resources.

According to an exemplary embodiment of the present disclosure, the first system is an NR system, and the second system is an LTE-MTC system, wherein the information about the resource positions occupied by the uplink or downlink signal transmitted periodically in the second system includes at least one of:

an LTE cell ID, an LTE system frame number, an LTE or MTC system bandwidth, a time domain and/or a frequency domain resource position of transmission of SIB1, an SIB1 frequency hopping sequence, a number of downlink narrowbands available for SIB1, or an index of each narrowband.

According to an exemplary embodiment of the present disclosure, the first system is an NR system, and the second system is an NB-IoT system, wherein the information about the resource positions occupied by the uplink or downlink signal transmitted periodically in the second system includes at least one of:

an LTE cell ID, an LTE system frame number, an LTE or NB-IoT system bandwidth, a frequency domain position of an NB-IoT anchor carrier, a frequency domain position of an NB-IoT non-anchor carrier, whether an anchor carrier or a non-anchor carrier overlaps with NR, an NB-IoT deployment scenario being TDD (Time Division Duplexing) or FDD (Frequency Division Duplexing), a time domain and/or frequency domain resource position of transmission of SIB1, whether there is an additional SIB1 transmission in the NB-IoT system, a time domain and/or frequency domain resource position used for the additional SIB1 transmission, or a position of NRS (Narrowband Reference Signal) transmission on an NB-IoT non-anchor carrier.

According to an exemplary embodiment of the present disclosure, the information about the position of NRS transmission on the NB-IoT non-anchor carrier includes at least one of: a subframe in which an NRS is transmitted in the NB-IoT system, configuration information about paging search space on the NB-IoT non-anchor carrier, position information about paging PDCCH (Physical Downlink Control Channel) candidate time-frequency resource on the NB-IoT non-anchor carrier, configuration information about Type 2 common search space for RAR (Random Access Response), Type 1A and Type 2A PDCCH configuration information, resource positions of PDSCH (Physical Downlink Shared Channel) of Msg4, resource positions of PDSCH scheduled in G-RNTI (Group-Radio Network Temporary Identity) or SC-RNTI (Single Cell-Radio Network Temporary Identity) scrambled DCI (Downlink Control Information), whether the NB-IoT supports a feature introduced in Release 16 that the NRS transmission presents even if there is no NPDCCH (Narrowband PDCCH) transmission on the non-anchor carrier, or NRS configuration information introduced by Release 16 features.

According to an exemplary embodiment of the present disclosure, the obtaining the information about the overlapped frequency domain resources includes:

obtaining the information about the overlapped frequency domain resources according to a configuration indicated in a higher layer signaling and/or a physical layer signaling.

According to an exemplary embodiment of the present disclosure, the obtaining the information about the resource positions occupied by the uplink or downlink signal transmitted periodically in the second system includes:

obtaining the information about the resource positions occupied by the uplink or downlink signal transmitted periodically in the second system according to a configuration indicated in a higher layer signaling and/or a physical layer signaling.

According to an exemplary embodiment of the present disclosure, the transmission method further includes: deriving, based on the received second signal/channel in the second system, the first signal/channel that is not transmitted on other resources of all resources of the first system than the range of resources for the transmission of the first signal/channel, or using the received second signal/channel directly in the first system.

According to an exemplary embodiment of the present disclosure, the first signal/channel and the second signal/channel are downlink reference signals, and the using the received second signal/channel directly in the first system includes: using the received second signal/channel directly in downlink channel estimation of the first system.

According to an exemplary embodiment of the present disclosure, the range of resources may be a range of RBs or carriers containing REs (Resource Elements) on which the first signal/channel or the second signal/channel is mapped.

According to an exemplary embodiment of the present disclosure, the transmitting includes transmitting an uplink signal/channel and/or receiving a downlink signal/channel.

According to an exemplary embodiment of the present disclosure, the first signal/channel is a downlink reference signal, and the received second signal/channel may be used together with the first signal/channel for the downlink channel estimation of the first system.

According to an exemplary embodiment of the present disclosure, the monitoring the second signal/channel includes: monitoring the second signal/channel on all resources of the first system, or on other resources of all resources of the first system than the range of resources for the transmission of the first signal/channel.

According to an exemplary embodiment of the present disclosure, the association includes at least one of: positions of time-frequency resources used for the transmission of the first signal/channel, and positions of time-frequency resources used for the transmission of the second signal/channel, a mapping relationship between antenna ports of the first signal/channel and the second signal/channel, information about precoders of the first signal/channel and the second signal/channel, or a power offset between the first signal/channel and the second signal/channel.

According to an exemplary embodiment of the present disclosure, the positions of the time-frequency resource positions may be positions of REs on which the first signal/channel or the second signal/channel is mapped.

According to an exemplary embodiment of the present disclosure, the obtaining the association includes one of:

obtaining the association by a higher layer signaling and/or a physical layer signaling;

obtaining the association according to an explicit configuration; or obtaining the association according to a predefined implicit configuration.

According to another aspect of the present disclosure, there is provided a transmission method in a wireless communication system, wherein a first system and a second system exist in the wireless communication system, and frequency domain resources used by the first system and the second system at least partially overlap with each other, the transmission method including: in the first system, determining overlapped frequency domain resources, the determined overlapped frequency domain resources including frequency domain resources overlapped at a subcarrier level; notifying the overlapped frequency domain resources; and performing operations of: avoiding performing a downlink transmission and/or avoiding monitoring an uplink transmission on the determined overlapped frequency domain resources, and/or configuring a terminal device to avoid performing an uplink transmission and/or avoid monitoring a downlink transmission on the determined overlapped frequency domain resources.

According to an exemplary embodiment of the present disclosure, the determining the overlapped frequency domain resources includes one or any combination of:

using predefined overlapped frequency domain resources;
determining the overlapped frequency domain resources according to a first predetermined condition; and
determining the overlapped frequency domain resources according to a configuration.

According to an exemplary embodiment of the present disclosure, the determining the overlapped frequency domain resources according to the first predetermined condition includes:

determining, according to received indication information, whether the first system and/or the second system is a predetermined communication system, and/or whether time domain and/or frequency domain resources used by the first system and/or the second system meet a second predetermined condition; and
if so, determining predefined frequency domain resources corresponding to the predetermined communication system and/or the second predetermined condition as the overlapped frequency domain resources.

According to an exemplary embodiment of the present disclosure, the predetermined communication system may be an LTE-MTC system.

According to an exemplary embodiment of the present disclosure, the notifying the overlapped frequency domain resources includes: indicating the overlapped frequency domain resources in a higher layer signaling and/or a physical layer signaling.

According to an exemplary embodiment of the present disclosure, the notifying the overlapped frequency domain resources includes: indicating the overlapped frequency domain resources in a bitmap in a signaling, the bitmap including a subcarrier-level bitmap.

According to an exemplary embodiment of the present disclosure, the avoiding performing the uplink transmission and/or avoiding monitoring the downlink transmission on the determined overlapped frequency domain resources includes one of:

puncturing the overlapped frequency domain resources or performing rate matching around the overlapped frequency domain resources, and/or configuring the overlapped frequency domain resources as reserved or unavailable resources; and
shifting frequency domain positions of RBs according to the determined overlapped frequency domain resources and/or a configuration of a frequency domain position of a starting subcarrier of the RBs, so that the frequency domain resources of the first system and the second system do not overlap any more.

According to an exemplary embodiment of the present disclosure, the configuration of the frequency domain position of the starting subcarrier of the RBs includes at least one of information on whether to enable a feature of adjusting the frequency domain position of the starting subcarrier, an offset of the frequency domain position of the starting subcarrier, a shifting direction of the starting subcarrier, a range of RBs of which the frequency domain position of the starting subcarrier is adjusted, a type of the first system and/or the second system, positions of the frequency domain resources of the first system and/or the second system, a position of a center frequency point or a DC subcarrier of the first system and/or the second system, or whether all or specific frequency domain resources of the first system and/or the second system include the DC subcarrier.

According to an exemplary embodiment of the present disclosure, the range of RBs of which the frequency domain position of the starting subcarrier is adjusted is all uplink and/or downlink RBs in a system bandwidth of the first system, or specific uplink and/or downlink RBs in the system bandwidth determined according to at least one of: a predefined criterion, the determined overlapped frequency domain resources, or the determined configuration of the frequency domain position of the starting subcarrier of the RBs.

According to an exemplary embodiment of the present disclosure, the shifting the frequency domain positions of the RBs according to the determined overlapped frequency domain resources and/or the configuration of the frequency domain position of the starting subcarrier of the RBs includes:

determining, according to the determined overlapped frequency domain resources and/or the configuration of the frequency domain position of the starting subcarrier of the RBs, at least one of: an offset of the starting subcarrier of the RBs, a shifting direction of the starting subcarrier, or a range of RBs of which the frequency domain position of the starting subcarrier is adjusted; and
shifting the frequency domain position of the starting subcarrier of the range of RBs by the offset towards the shifting direction, and determining the shifted frequency domain position of the range of RBs according to the shifted position of the starting subcarrier.

According to an exemplary embodiment of the present disclosure, the first system is one of an LTE-MTC system and an NR system, and the second system is the other of the LTE-MTC system and the NR system.

According to another aspect of the present disclosure, there is provided a transmission method in a wireless communication system, wherein a first system and a second system exist in the wireless communication system, and time-frequency resources used by the first system and the second system at least partially overlap with each other, the transmission method including: in the first system, notifying configuration information, wherein the configuration information includes a specific signal/channel pattern, the pattern including at least a part of overlapped time-frequency resources; and the configuration information further includes information about the overlapped time-frequency resources, and/or indication information, wherein the indication information includes: information indicating not monitoring a downlink transmission of the specific signal/channel, and/or information indicating not transmitting an uplink transmission of the specific signal/channel; and performing operations of: not transmitting the downlink transmission of the specific signal/channel, and/or not monitoring the uplink transmission of the specific signal/channel.

According to an exemplary embodiment of the present disclosure, the specific signal/channel is a specific class of signals/channels or a specific subset of the specific class of signals/channels.

According to an exemplary embodiment of the present disclosure, the specific signal/channel is a PT-RS.

According to another aspect of the present disclosure, there is provided a transmission method in a wireless communication system, wherein a first system and a second system exist in the wireless communication system, frequency domain resources used by the first system and the second system at least partially overlap with each other, and there is an uplink or a downlink signal transmitted periodically in the second system, the transmission method including: in the first system, notifying overlapped frequency domain resources, and notifying resource positions occupied by the uplink or downlink signal transmitted periodically in the second system, the uplink or downlink signal transmitted periodically including at least SIB 1 and/or NRS; and avoiding performing an uplink transmission and/or avoiding monitoring a downlink transmission at the resource positions occupied by the uplink or downlink signal in the second system.

According to an exemplary embodiment of the present disclosure, the avoiding the uplink transmission and/or avoiding monitoring the downlink transmission at the resource positions occupied by the uplink or downlink signal in the second system includes:

puncturing the resource positions occupied by the uplink or downlink signal in the second system or performing rate matching around the resource positions occupied by the uplink or downlink signal in the second system, and/or configuring the resource positions occupied by the uplink or downlink signal in the second system as reserved resources or unavailable resources.

According to an exemplary embodiment of the present disclosure, the first system is an NR system, the second system is an LTE-MTC system, and wherein the information about the resource positions occupied by the uplink or downlink signal transmitted periodically in the second system includes at least one of:

an LTE cell ID, an LTE system frame number, an LTE or MTC system bandwidth, a time domain and/or a frequency domain resource position of transmission of SIB1, an SIB1 frequency hopping sequence, a number of downlink narrowbands available for SIB1, or an index of each narrowband.

According to an exemplary embodiment of the present disclosure, the first system is an NR system, the second system is an NB-IoT system, and wherein the information about the resource positions occupied by the uplink or downlink signal transmitted periodically in the second system includes at least one of:

an LTE cell ID, an LTE system frame number, an LTE or NB-IoT system bandwidth, a frequency domain position of an NB-IoT anchor carrier, a frequency domain position of an NB-IoT non-anchor carrier, whether an anchor carrier or a non-anchor carrier overlaps with NR, an NB-IoT deployment scenario being TDD or FDD, a time domain and/or frequency domain resource position of transmission of SIB1, whether there is an additional SIB1 transmission in the NB-IoT system, a time domain and/or frequency domain resource position used for the additional SIB1 transmission, or a position of Narrowband Reference Signal 'NRS' transmission on an NB-IoT non-anchor carrier.

According to an exemplary embodiment of the present disclosure, the information about the position of NRS transmission on the NB-IoT non-anchor carrier includes at least one of: a subframe in which an NRS is transmitted in the NB-IoT system, configuration information about paging search space on the NB-IoT non-anchor carrier, position information about paging PDCCH candidate time-frequency resource on the NB-IoT non-anchor carrier, configuration information about Type 2 common search space for RAR, Type 1A and Type 2A PDCCH configuration information, resource positions of PDSCH of Msg4, resource positions of PDSCH scheduled in G-RNTI or SC-RNTI scrambled DCI, whether the NB-IoT supports a feature introduced in Release 16 that the NRS transmission presents even if there is no NPDCCH transmission on the non-anchor carrier, or NRS configuration information introduced by Release 16 features.

According to an exemplary embodiment of the present disclosure, the notifying the overlapped frequency domain resources includes:

notifying the overlapped frequency domain resources in a higher layer signaling and/or a physical layer signaling.

According to an exemplary embodiment of the present disclosure, the notifying the resource positions occupied by the uplink or downlink signal transmitted periodically in the second system includes:

notifying the resource positions occupied by the uplink or downlink signal transmitted periodically in the second system according to a configuration indicated in a higher layer signaling and/or a physical layer signaling.

According to another aspect of the present disclosure, there is provided a transmission method in a wireless communication system, wherein a first system and a second system exist in the wireless communication system, the transmission method including: in the first system, notifying an association between a first signal/channel in the first system and a second signal/channel in the second system, at least one of the following may be determined according to the association and a predefined criterion: a range of resources for a transmission of the first signal/channel included in the first system, or a range of resources for a transmission of the second signal/channel included in the second system; and transmitting the first signal/channel only within the range of resources for the transmission of the first signal/channel.

According to an exemplary embodiment of the present disclosure, the transmission method further includes: monitoring the second signal/channel.

According to an exemplary embodiment of the present disclosure, the transmission method further includes: deriving, based on the received second signal/channel in the second system, the first signal/channel that is not transmitted on other resources of all resources of the first system than the range of resources for the transmission of the first signal/channel, or using the received second signal/channel directly in the first system.

According to an exemplary embodiment of the present disclosure, the range of resources may be a range of RBs or carriers containing REs on which the first signal/channel or the second signal/channel is mapped.

According to an exemplary embodiment of the present disclosure, the transmitting includes transmitting an uplink signal/channel and/or receiving a downlink signal/channel.

According to an exemplary embodiment of the present disclosure, the positions of the time-frequency resource positions may be positions of REs on which the first signal/channel or the second signal/channel is mapped.

According to an exemplary embodiment of the present disclosure, the monitoring the second signal/channel includes: monitoring the second signal/channel on all resources of the first system, or on other resources of all resources of the first system than the range of resources for the transmission of the first signal/channel.

According to an exemplary embodiment of the present disclosure, the association includes at least one of: positions of time-frequency resources used for the transmission of the first signal/channel, and positions of time-frequency resources used for the transmission of the second signal/channel, a mapping relationship between antenna ports of the first signal/channel and the second signal/channel, information about precoders of the first signal/channel and the second signal/channel, or a power offset between the first signal/channel and the second signal/channel.

According to an exemplary embodiment of the present disclosure, the positions of the time-frequency resource positions may be positions of REs on which the first signal/channel or the second signal/channel is mapped.

According to an exemplary embodiment of the present disclosure, the notifying the association includes one of:

notifying the association by a higher layer signaling and/or a physical layer signaling;

notifying the association according to an explicit configuration; or notifying the association according to a predefined implicit configuration.

According to another aspect of the present disclosure, there is provided a radio node in a wireless communication system, including: a processor; and a memory storing computer-executable instructions which, when executed by the processor, cause the processor to perform the method according to any of the above aspects of the present disclosure.

According to another aspect of the present disclosure, there is provided a computer-readable medium having stored thereon instructions which, when executed by a processor, cause the processor to perform the method according to any of the above aspects of the present disclosure.

The invention claimed is:

1. A method performed by a user equipment (UE) in a wireless communication system, the method comprising:
    obtaining information on frequency domain resources for a first system or a second system;
    identifying at least one frequency domain resource overlapped at a subcarrier level, from the frequency domain resources for the first system or the second system;
    receiving, from a base station, configuration information including at least one resource block (RB) associated with the at least one frequency domain resource, a value of a subcarrier offset within the at least one RB, and a shifting direction of a starting subcarrier; and
    shifting a location of the at least one frequency domain resource along the shifting direction based on the value of the subcarrier offset.

2. The method of claim 1, wherein the at least one overlapped frequency domain resource is determined based on at least one of:
    predefined overlapped frequency domain resources; or
    a predetermined condition.

3. The method of claim 1, further comprising:
    puncturing the at least one overlapped frequency domain resource; or
    performing rate matching around the at least one overlapped frequency domain resource; or
    processing the at least one overlapped frequency domain resource as reserved or unavailable resources.

4. The method of claim 1, wherein the configuration information includes at least one of:
    information on whether to enable a shifting of a position of the starting subcarrier;
    a range of RBs of which the starting subcarrier for the shifted location is included;
    a type of the first system or the second system;
    positions of the frequency domain resources of the first system or the second system; or
    a position of a center frequency point or a direct current (DC) subcarrier for the first system or the second system.

5. A user equipment (UE) in a wireless communication system, UL comprising:
    a transceiver; and
    a controller coupled to the transceiver, and configured to:
        obtain information en frequency domain resources for a first system or a second system,
        identify at least one frequency domain resource overlapped at a subcarrier level, from the frequency domain resources for the first system or the second system,
        receive, from a base station, configuration information including at least one resource block (RB) associated with the at least one frequency domain resource, a value of a subcarrier offset within the at least one RB, and a shifting direction of a starting subcarrier, and
    shift a location of the at least one frequency domain resource along the shifting direction based on the value of the subcarrier offset.

6. The UE of claim 5, wherein the at least one overlapped frequency domain resource is determined based on at least one of:
    predefined overlapped frequency domain resources; or
    a predetermined condition.

7. The UE of claim 5, wherein the controller is further configured to:
    puncture the at least one overlapped frequency domain resources; or
    performing rate matching around the at least one overlapped frequency domain resources; or
    processing the at least one overlapped frequency domain resources as reserved or unavailable resources.

8. The UE of claim 5, wherein the configuration information includes at least one of:
    information on whether to enable a shifting of a position of the starting subcarrier:
    a range of RBs of which the starting subcarrier for the shifted location is included;
    a type of the first system or the second system:
    positions of the frequency domain resources of the first system or the second system; or
    a position of a center frequency point or a direct current (DC) subcarrier for the first system or the second system.

* * * * *